United States Patent [19]

Catherall et al.

[11] 3,789,203

[45] Jan. 29, 1974

[54] FUNCTION GENERATION BY APPROXIMATION EMPLOYING INTERATIVE INTERPOLATION

[75] Inventors: Reginald Catherall, Woking; Susan Knowles, Reading, both of England

[73] Assignee: The Solartron Electronic Group Ltd., Farnborough, Hampshire, England

[22] Filed: July 16, 1971

[21] Appl. No.: 163,360

[30] Foreign Application Priority Data

July 17, 1970 Great Britain .................. 34,900/70

[52] U.S. Cl. ................................................ 235/152
[51] Int. Cl. ............................................. G06f 7/38
[58] Field of Search. 236/152, 197; 444/1; 235/152, 235/197

[56] References Cited

UNITED STATES PATENTS

| | | | |
|---|---|---|---|
| 3,684,876 | 8/1972 | Sutherland | 235/152 |
| 3,649,821 | 3/1972 | Gumacos | 235/152 |
| 3,412,240 | 11/1968 | Hunt et al. | 235/152 X |
| 3,564,222 | 2/1971 | DiPaolo | 235/152 |

*Primary Examiner*—Eugene G. Botz
*Assistant Examiner*—David H. Malzahn
*Attorney, Agent, or Firm*—William R. Sherman; Roylance, Abrams, Berdo & Kaul

[57] ABSTRACT

A method of solving a function for values of a variable when values of an independent variable are given, the method being especially valuable for use in or with a computer, an advantage being minimization of storage requirements. The method is an extension of the branch of mathematics known as numerical analysis, and specifically of the division of that branch known as approximation. An expression is developed for a locus of points which approach points on the given function, i.e., a polynomial expression having a high degree of convergence. The method includes finding solutions to the terms of the polynomial expression by reiterated interpolation. Only a relatively small number of factors need be stored. The method can be employed to calculate values to predetermined accuracy, and is suitable for many functions although it is especially well suited for many transcendental functions. Embodiments of apparatus suitable for performing the method are also disclosed. The apparatus includes elements of electronic data processing such as shift registers, adders, and the like to perform the interpolation involving addition, subtraction and division by 2. The algorithm developed as a manifestation of this method is describable as an add-shift algorithm.

22 Claims, 24 Drawing Figures

*INVENTORS*
Reginald Catherall
Susan Knowles

BY [signature]

ATTORNEY

FUNCTION GENERATION BY APPROXIMATION EMPLOYING INTERATIVE INTERPOLATION

This invention relates to methods of and apparatus for generating values of trigonometric and other mathematical functions.

There are many data processing situations in which it is required to have available the value of a function $f(x)$ at any value of $x$ within a given range. For example, it may be desirable to insert a given value of x and be able to have available the value of $y$ which corresponds to that value of x for the relationship $y = a \sin x$. The various values of $y$, the dependent variable, can be calculated in advance and stored in a read only memory, hereinafter abbreviated ROM, for as many values of $x$ as will be needed in subsequent operations of the data processing system. However, if a large number of values of the dependent variable will probably be needed, the required size of the memory becomes very large, and therefore very costly. It is, however, a standard technique in present day data processing systems to include a table of values in computer storage. This technique is frequently referred to as a "table look-up sub routine."

It is an object of this invention to provide an electronic data processing technique for calculating values of a dependent variable of a function from given values to an independent variable in a manner which requires minimal storage capacity.

A further object of this invention is to provide a method of and an apparatus for generating desired values of a function in an efficient manner and minimizing the amount of data which has to be stored.

An important advantage of the invention is that the apparatus can readily be constructed using shift registers and serial adders. It is contemplated that special purpose circuitry for generating widely used desired functions such as sin $\theta$, tangent $\theta$ and the like can be provided (as taught herein) as standard integrated circuits or that equivalent portions of a computer can be utilized in accordance with the invention. One concerned with data processing will then be able to obtain, at reasonable cost, apparatus for accurately computing such functions. The present invention includes, in one aspect, a method of generating a value of a dependent variable of a function for a given value of the independent variable wherein two point values of the function are added and divided by 2 to form a new point value, this new point value then being substituted for one of the previously used two point values to form a new pair of point values which bracket the given value of the independent variable. The terms of the approximating function, which is in the form of a polynomial expression, and the coefficients thereof are so chosen to produce point values the locus of which closely approximates a desired function. The steps of substituting newly developed point values for previously used values is reiterated to continuously bracket, but continuously more narrowly, the value of the independent variable and, hence, the value of the dependent variable.

According to the invention in another aspect there is provided digital computing apparatus arranged to generate the value of an approximating function for a given value of an independent variable, the apparatus being arranged to add a first pair of programmed point values, divide the sum by two and combine algebraically therewith a residual need factor to form a new point value, the apparatus being further arranged to examine the value of the independent variable and to replace one of the pair of point values by the new point value to form a new pair of point values such that the segment defined there-between includes the value of the independent variable, and to perform the operations specified above iteratively with the new pair of point values and the appropriate residual need factor.

In order that the manner in which the foregoing is attained in accordance with the invention can be understood in detail, particularly advantageous embodiments thereof will be described with reference to the accompanying drawings, which form a part of this specification, and wherein.

A system of polynomial approximation has been developed that offers a satisfactory solution to the majority of function approximation problems encountered by the engineer. The system, which is particularly suitable for implementation with a digital computer or other digital hardware, is hereinafter referred to as "The Binary Polynomials." Binary polynomial approximation is defined as that which gives points of exact fit arising in a binary sequence of $x$.

When a polynomial approximation is used to find the values of $y$ in the expression $y = f(x)$ over a particular range of $x$, it is common practice to first normalize the problem to an $x$ range of either −1 to +1, or 0 to 1. The family of binary polynomials developed herein will be defined for these two $x$ ranges. The nth order polynomial will use the notation $B_n$ for the range −1 to +1 and $B_n$* for the $x$ range 0 to 1.

Figure 1:
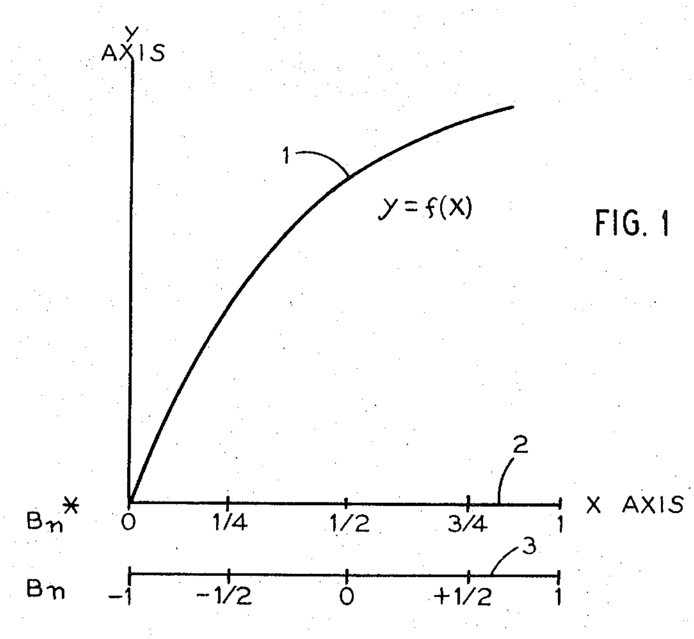
FIG. 1 is a diagram showing the locus of the function $y = f(x)$ plotted on $x$ and $y$ axes.

Referring to FIG. 1, the diagram shows a $y$ axis with a curve 1 representing the locus of the function $y = f(x)$. An $x$ scale 2 is provided with the $x$ values "normalized" to the range 0 − 1, this being the scale used with $B_n$* terms. A scale 3 depicts the range −1 to +1 and is used in $B_n$ terms. The polynomial expressions described herein contain the factor $x$; hence, each change in $x$ scaling results in a new, although closely related, set of polynomial expressions. Unless otherwise described, all of the examples used herein will be in the $x$ range of 0 to 1. Before describing the construction or use of binary polynomials it will be advantageous to derive a simple polynomial expression in a well-known example. In the example to be described a polynomial approximating function is developed for the sin $\theta$ but the process of development is applicable to many transcendental functions. The example is restricted to the approximation of the sin $\theta$ in the quadrant 0° to 90° and $\theta$ is normalized to an $x$ range of 0 to 1.

Figure 2:
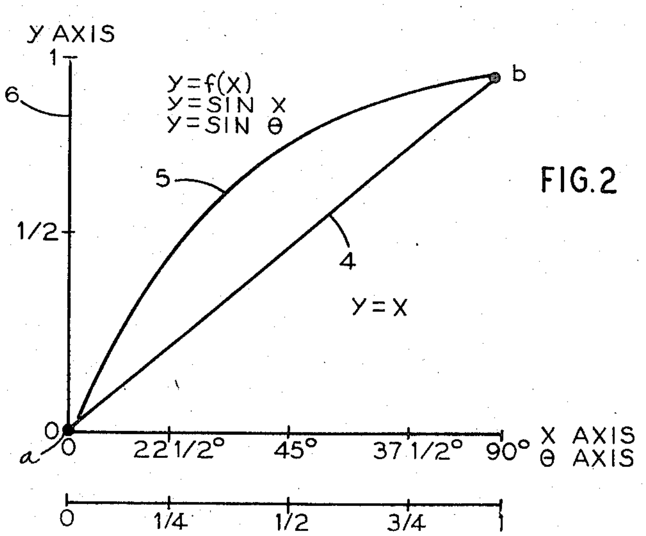
FIG. 2 is a plot of $y = f(x)$ where $f(x)$ is equal to sin $x$ and also shows a straight line defined by $y = x$.

Referring to FIG. 2 the diagram shown therein includes an $x$ and a $y$ scale. The graphic representation of a straight line 4 and a plot 5 of sine values is shown. A $y$ axis 6 is calibrated from 0 value at the origin to a maximum value of 1. The $x$ axis is calibrated in two sets of values: from 0° to 90° and from 0 to 1. Thus the y values of the sine function can be equated to the $x$ scale in terms of the angle $\theta$ or the values of $x$. The equation of the sine function may then be expressed as $y = \sin \theta$ or $y = \sin x$.

Two specific points have been designated on the graphical representation FIG. 2. Point "a" is the origin and may be thought of as the value of $y$ at the $x$ intercept (where $x = 0$), i.e., the origin $x = 0$, $y = 0'$, and the point "$b$" is the value of $y$ where $x = 1$, or the point designated $y = 1, x = 1$. Now consider a line drawn between points $a$ and $b$. The equation may be expressed in a number of ways. For example, since $a$ is the point where $x = 0$ and $y = 0$, and $b$ is the point where $x = 1$, $y = 1$, then $y = x$ for all values of $x$. The conventional equation of the line is $y = mx + b$ where $m$ is the slope. Finally, in the form most convenient to generation of the polynomial, the equation for the line is $y = a + (b - a)x$.

In the development of the polynomial approximation of the function $y = \sin \theta$, or $y = f(x)$, the first two terms of the polynomial are contained in the expression $y = a + (b - a)x$, i.e., "$a$" is the origin and "$(b - a)x$" is the linear term. A solution of this expression will only supply values $y = x$, i.e., a straight line, which is grossly in error for approximating $y = f(x)$ where $f(x)$ is sin $\theta$. In order for the polynomial expression more closely to approximate the expression $y = \sin \theta$, it is necessary to add additional terms. The equation for a parabola $4x(1 - x)$ most nearly defines the "difference" between the linerar expression $y = x$ and the sine function $y = \sin \theta$. Thus, a term describing a parabola, when added to the linear terms described above, makes the total expression a closer approximation to the desired sine function.

Figure 3:
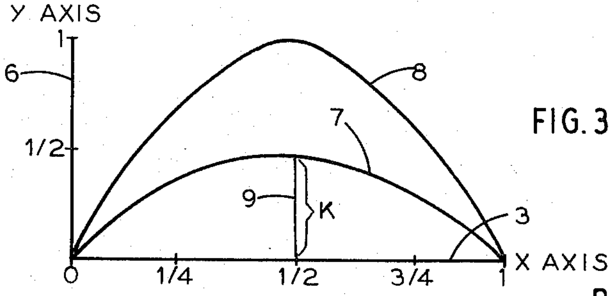
FIG. 3 is a graph of the "difference values" between the expressions $y = \sin x$ and $y = x$, and includes the plot of a parabola.

In FIG. 3 there are shown a $y$ axis 6, an $x$ axis 3, and a curve 7 which is a plot of the "difference values" between the $y$ value of the linear expression, i.e., the straight line $y = a + (b - a)x$ and the desired function $y = \sin x$ as shown in FIG. 2. This "difference value" is called K and its amplitude at $x = ½$ is shown by a vertical line segment 9. Also shown in FIG. 3 is a plot of a parabola 8 for the expression $4x(1 - x)$. It will be noticed that at $x = 0.5$ the parabola has a maximum $y$ value of 1. In order that the polynomial expressions provide an exact value of $y$ for the sin $\theta$ where $\theta = 45°$ or $x = ½$ it is necessary that the parabolic term supply the exact difference between the linear term and the sine function at that $x$ value. This is achieved by multiplying the parabolic term $4x( - x)$ by a scale factor which in this case is called K. It is important to note that hereinafter the scale factor will be designated the coefficient and, in the system of notation presently employed ,gn is called the addressed coefficient. Thus the parabolic term is $K4x(1 - x)$. A polynomial expression which will provide exact values of the sine function for the $x$ values of 0, ½ and 1 may be written $y = a + (b - a)x + K4x(1 - x)$.

Figure 4:
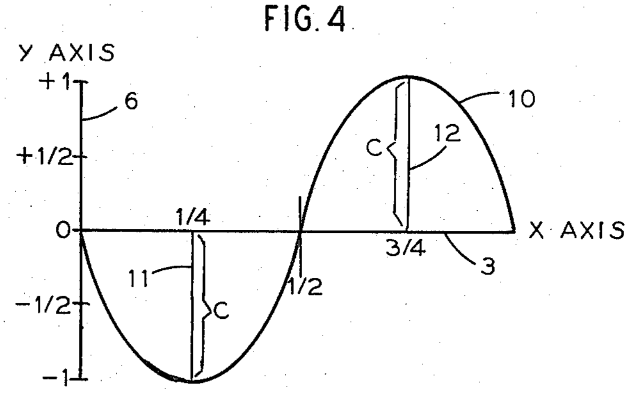
FIG. 4 is a plot of the differences between the sine function and the polynomial expression $y = a + (b - a)x + K4x(1 - x)$.

The same process may be used to produce a polynomial equation which will more nearly represent the sine function and will be exact for $x$ values other than 0, ½ and 1. A comparison of the values of the polynomial expression just developed, including the parabolic term, reveals differences in y values that take the form shown by a curve 10 in FIG. 4.

Curve 10 is a plot of the differences, designated C, between the sine function and the polynomial expression which includes enough terms to approximate a parabola. The value of C at $x = ¼$ and $x = ¾$ is shown by vertical line segments 11 and 12, respectively. The addition of a cubic term to the polynomial expression will considerably reduce the magnitude of this difference. Note that curve 10 is not symmetrical about the x axis and therefore the cubic term takes the form $64/3\, x\,(1 - x)\,(x - ½)$. In this term 64/3 is the addressed coefficient, the expression $x(1 - x)$ is similar to the parabolic term, and the factor $(x - ½)$ is used to secure the center 0 while the negative sign causes the polarity inversion. The polynomial expression including the origin, linear, parabolic and cubid terms may then be written as follows;

$$y = a + (b - a)x + K4x(1 - x) + C\ 64/3\, x\,(1 - x)\,(x - ½).$$

Table 1 is a listing of the mathematical expressions for each of the polynomial orders from the linear through the octic terms. Note, for example, that in the quadratic polynomial, the expression $4x(1 - x)$ is designated $B_2$*, were the subscript 2 indicates the order and the asterisk indicates the $x$ range of 0 to 1. In column 3, again for the quadratic example, K is the addressed coefficient and $g_2$ is the preferred coefficient notation, to be described hereinafter, for the 2nd order polynomial. Table 2 has a format identical to Table 1 but the polynomial terms B and the coefficient terms $g$ are for the $x$ range −1 to +1, this being indiacted by the absence of an asterisk.

TABLE 1

| Polynomial Order | Polynomial $B_n$* | Preferred Coefficient Notation |
|---|---|---|
| | $B_o$* = 1 | $g_o = (b + a)$ |
| Linear | $B_1$* = $2x - 1$ | $g_1 = (b - a)$ |
| Quadratic | $B_2$* = $4x(1 - x)$ | $g_2$ = K |

| | | |
|---|---|---|
| Cubic | $B_3^* = 64/3x(1-x)(x-\frac{1}{2})$ | $g_3 = C$ |
| Quartic | $B_4^* = 256/3x(1-x)(x-\frac{1}{2})^2$ | $g_4 = Q$ |
| Quintic | $B_5^* = 2^{18}/15\ x(1-x)(x-\frac{1}{4})(x-\frac{3}{4})$ | $g_5 = I$ |
| Sextic | $B_6^* = 2/45\ x(1-x)(x-\frac{1}{2})^2(x-\frac{3}{4})$ | $g_6 = S$ |
| Septic | $B_7^* = 2^{15}/15\ x(1-x)(x-\frac{1}{2})(x-\frac{1}{4})^2(x-\frac{3}{4})^3$ | $g_7 = P$ |
| Octic | $B_8^* = 2^{18}/45\ x(1-x)(x-\frac{1}{2})^2(x-\frac{1}{4})^2(x-\frac{3}{4})^2$ | $g_8 = E$ |

TABLE 2

| Polynomial Order | Polynomial $B_n$ | Preferred Coefficient Notation |
|---|---|---|
| | $B_o = 1$ | $g_o = (b+a)$ |
| Linear | | |
| | $B_1 = x$ | $g_1 = (b-a)$ |
| Quadratic | $B_2 = (1+x)(1-x)$ | $g_2 = K$ |
| Cubic | $B_4 = 8/3x(1+x)(1-x)$ | $g_3 = C$ |
| Quartic | $B_4 = 16/3x^2(1+x)(1-x)$ | $g_4 = Q$ |
| Quintic | $B_5 = 2^7/15\ x(1+x)(1-x)(x+\frac{1}{2})(x-\frac{1}{2})$ | $g_5 = I$ |
| Sextic | $B_6 = 2^9/45\ x^2(1+x)(1-x)(x+\frac{1}{2})(x-\frac{1}{2})$ | $g_6 = S$ |
| Septic | $B_7 = 2^8/15\ x(1+x)(1-x)(x+\frac{1}{2})(x-\frac{1}{2})$ | $g_7 = P$ |
| Octic | $B_8 = 2^{10}/45x^2(1+x)(1-x)(x+\frac{1}{2})^2(x-\frac{1}{2})^2$ | $g_8 = E$ |

Before continuing with a discussion of the more general form of the polynomial expression, it is important to understand the identifying name and function of each portion of the polynomial expression. There is shown below the polynomial expression which includes the cubic term.

TERMS

| Linear (straight line) origin | Quadratic (parabola) | Cubic |
|---|---|---|
| $y = a + (b-a)x$ | $+ K4x(1-x)$ | $+ C64/3x(1-x)(x-\frac{1}{2})$ |
| coefficient | normalizing factor | $x$ dependent factor |

The first two terms of the expression form the equation for a straight line which is determined by the origin, "$a$" and the second term, "$(b-a)x$." The next portion of the expression is the equation for a parabola and is called the quadratic term. The quadratic term is made up of a coefficient, a normalizing factor and an $x$ depending factor. The final portion of this polynomial expression consists of a term called the "cubic" which is also composed of a coefficient, a normalizing factor, and an $x$ dependent factor, as are all other terms of the polynomial expression, to be described herein. It is now possible to write the more general form of the polynomial expression.

Referring now to the equation below, the similarities between the general form of the polynomial expression and the polynomial expression previously described can readily be seen.

| linear term origin | quadratic term | cubic term |
|---|---|---|
| $y = g_oB_o^* + g_1B_1^*$ | $+ g_2B_2^*$ | $+ g_3B_3^*$ |
| addressed coefficient | polynomial: normalizing factor | $x$ dependent factor |

In this expression $g$ refers to the coefficient and B refers to a polynomial factor. The polynomial factor is made up of the normalizing factor and the $x$ dependent factor. The suffix numerals 0, 1, 2 and 3 indicate the polynomial order, i.e., origin, linear, quadratic and cubic terms, respectively. As discussed, the * indicates that the expression has been normalized through the $x$ range of 0 to 1.

As described previously the binary polynomial approximating series has been defined as that which gives points of exact fit arising in a binary sequence of $x$.

Thus, in this series to be derived for $y=f(x)$, the exact values of $y$ will occur at successive bisections of the $x$ range of 0 to 1 or −1 to +1. Thus, $x$ will be expressed in terms of $x = \frac{1}{2}$, $x = \frac{1}{4}$, $x = \frac{3}{4}$, etc. The hardware to be described hereinafter will implement polynomial expressions as arising from interpolation at binary $x$ values, to be in the form of an integer divided by a binary number. That is, the value of ⅞ is acceptable whereas 8/7 is not. As described, the coefficient and normalizing factor were chosen for the quadratic term, for example, so that there is an exact fit at $x = \frac{1}{2}$ between the polynomial expression and the sine curve. By exact fit it is meant that a solution to the polynomial expression including a quadratic term at $x = \frac{1}{2}$ will provide an exact value of $y$ for the sine of 45°. Thus, when addressed with the appropriate coefficients, the binary polynomial establishes exact fit of $y=f(x)$ for as many steps of binary $x$ succession as possible with the polynomial orders employed.

Table 3 lists in column 2 the polynomial terms employed to obtain the points of exact fit listed in column 1. It will be noted in Table 3 that term $g_3B_3^*$ and $g_4B_4^*$ must be employed before an exact fit is achieved for $x = \frac{1}{4}$ and $\frac{3}{4}$.

The cubic term $g_3B_3^*$ was employed to render the error equal at those two points, but it is not until the following term $g_4B_4^*$ is employed that the differences at the points $x = \frac{1}{4}$ and $\frac{3}{4}$ are reduced to O. With reference to the terms listed in columns 2 of Table 3 below, it is necessary to develop additional groups of 2 and 4 etc. polynomials to attain this next stage exact fit.

TABLE 3

| Point of Exact Fit | Additional Polynomial Terms Needed |
|---|---|
| $x = 0$ and 1 | $g_oB_o^*$ and $g_1B_1^*$ |
| $x = \frac{1}{2}$ | $g_2B_2^*$ |
| $x = \frac{1}{4}$ or $\frac{3}{4}$ | $g_3B_3^* + g_4B_4^*$ |
| $x = \frac{1}{8}, \frac{3}{8}, \frac{5}{8}$ or $\frac{7}{8}$ | $g_5B_5^* + g_6B_6^* + g_7B_7^* + g_8B_8^*$ |
| etc. | |

In general, the approximation to a transcendental function (such as sin $x$) over a range where the function is monotonic (that is, the function contains the preceding set) the addition of each binomial of higher order will give a similar factor-of-accuracy improvement. This situation of continued convergence applies with very few reservations when the polynomial orders are added in pairs.

A fundamental rule of the binary polynomial series is that as each point of exact fit is established all subsequent polynomials will preserve this fit. That is, employing the binary polynomial approximation including the quadratic term, an exact fit has been established for $x = 0$, $x = \frac{1}{2}$ and $x = 1$. The cubic polynomial $B_3$ and all subsequent polynomials must therfore contain the form $x(1-x)(x-\frac{1}{2})$. Continuing with an explanation of the rule of exact fit, the rule demands that the quartic polynomial $B_4$ must also contain the form $x(1-x)(x-\frac{1}{2})$ as the established points of exact fit are still $x = 0$, ½ and 1. However $B_4$ must be of the fourth order and the required form is obtained by adding a second factor $(x-\frac{1}{2})$. Thus, $B_4$ contains $x(1-x)(x-\frac{1}{2})^2$.

The coefficient and normalizing factor have been derived and discussed. It would be possible to combine these two factors without loss of effectiveness. However, they have significant practical value as their use results in the addressed coefficients having the ability to illustrate truncation error. Following truncation of the binary polynomial series at any order, the next one or two coefficients give a reasonably direct indication of the resulting approximation error. A detailed use of the truncation process will be described in detail later on.

Figure 5:
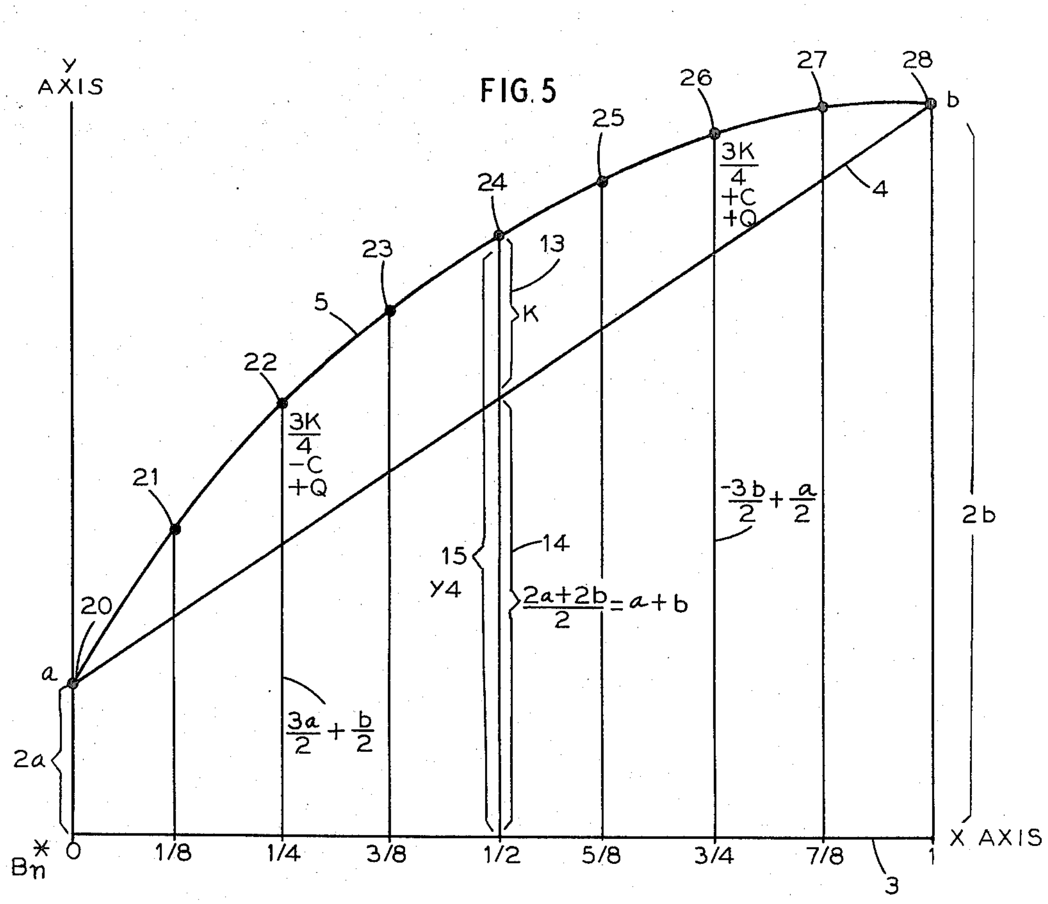
FIG. 5 is a graph of the functions $y = f(x)$ and $y = x$ wherein the functions have been displaced from the origin by $y = 2a$.
Figure 6:
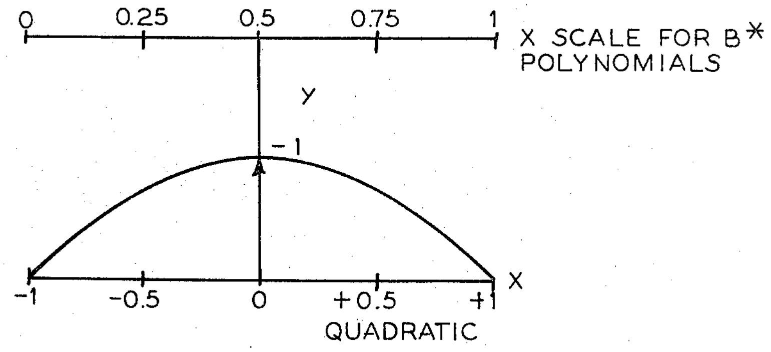
FIGS. 6–12 are graphs of the polynomial expressions from the second to the eighth order respectively.

The derivation and meaning of the binary polynomial expression has been described including a detailed explanation of the polynomial term $B_n^*$. A detailed discussion of the coefficient term $g_n$ is undertaken including determination of the values, system of notation, convergence, and other aspects. In describing the coefficients the graph of the straight line 4 and the curve 5 of the expression $y = f(x)$ as shown in FIG. 5, will be used for reference. The similarities and differences between FIG. 2 and FIG. 5 should be noted. In each case line 2 is a straight line drawn between points $a$ and $b$. Also, in each case, line 5 represents the function $y = f(x)$ and is drawn between points $a$ and $b$. However, it will be noticed that point a is no longer at the origin of the $y$ axis. Point $a$ now has a $y$ value of 2$a$ and point $b$ has a $y$ value of 2$b$. The $x$ axis has been calibrated from 0 to 1 for the polynomial $B_n^*$ and from −1 to +1 for $B_n$. Both calibrations of the $x$ axis are in binary sequence. That is, the range 0 to 1 has been first divided into half and that half divided into halves, continuing through as many steps as necessary so that the denominator of the fraction is always equal to 2 raised to the nth power. The coefficient K and the meaning of the phrase "exact fit" ) have been described with reference to FIGS. 2 and 3. It may be restated now with reference to FIG. 5 that the sum of K and $(a + b)$ indicated by the brackets 13 and 14, respectively, equals the value $y_4$ indicated at numeral 24, which lies on the curve $y = f(x)$. Because the point $y_4$ lies on the curve 2 an exact fit has been achieved. A general definition may now be applied, i.e., the binary polynomial natural coefficients are those which result in any approximation having a binary sequence of exact fits. The natural coefficients provide a high degree of conversion in function approximation and their use with a truncated polynomial series will be satisfactory for most needs. The significance of the truncated polynomial series, the modification of the natural coefficients for improved accuracy and the problem of non-binary $x$-based data samples will all be examined at a later time.

It is important to distinguish between the development and the use of binary polynomial expressions. In all the previously presented material the binary polynomial expression has been developed with reference to a transcendental function and the sine function is the specific example used. Discussion of the curves 7 and 10 shown in FIGS. 3 and 4, respectively, are plots of the differences between actual sine values and y values calculated from the quadratic and cubic terms, respectively, these differences being later reduced by employing additional terms.

The use of the binary polynomial expression is now described wherein it is necessary to insert certain "data samples" at selected "definition points" in order to approximate other desired values. Expressed in other terms it is possible to insert data samples as coefficients in the binary polynomial expression and to thereafter calculate other values of $y$ for binary values of $x$. The binary polynomial expression has been developed for two $x$ scales, 0 to 1 and −1 to +1 and this requires, as was previously discussed, that the problem is normalized to an $x$ range of 0 to 1 or −1 to +1.

FIGS. 6-12 inclusive, are graphs of the polynomials from the second to eighth order. It will be noted that again two $x$ scales are provided from 0 to 1 representing $B_n^*$ and −1 to +1 representing $B_n$. In each of these figures the normalizing factors for the $y$ value were established on the basis that the peak value of each polynomial is unity or as near unity as is consistent with the flow charts and algorithm considerations.

Shown below is Table 4 listing the definition points required for determination of the natural coefficients.

TABLE 4

| Polynomial Order | Coefficient | Definition Points |
|---|---|---|
| Linear | $a$ and $b$ | |
| Quadratic | K | 20 and 28 |
| Cubic | C | |
| | | 20, 24 and 28 |
| Quartic | Q | |
| Quintic | I | |
| Sextic | S | |
| | | 20 through 28 inclusive |
| Septic | P | |
| Octic | E | |

The terminology and notation used in this table are the same as the terminology and notation used in FIG. 5. This table lists the coefficient in column 2 opposite the polynomial order in column 1. In column 3 is listed the definition points. The data sample expressed as a value of $y$ must be assigned to each of the definition points in order to satisfy the requirements of the polynomial order represented. The significance of Table 4 is related only to the $g_n$ term, the coefficient of the binary polynomial expression.

Figure 7:
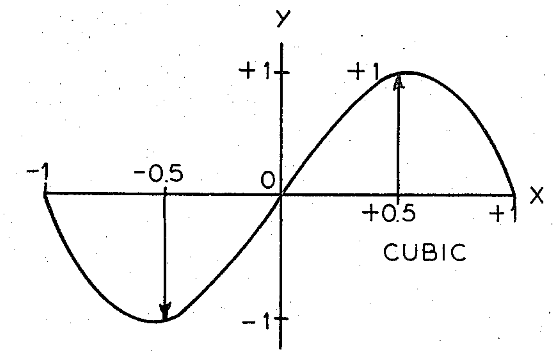
Figure 8:
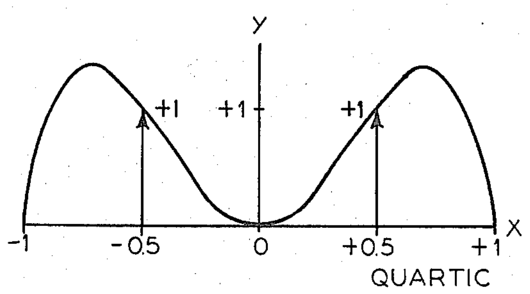
Figure 9:
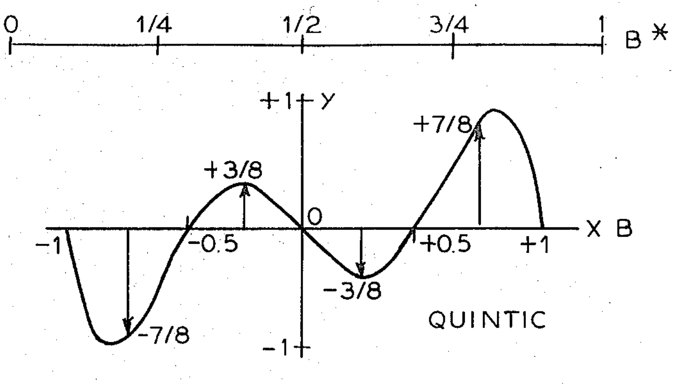
Figure 10:
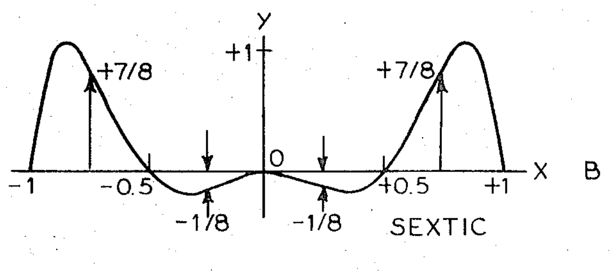
Figure 11:
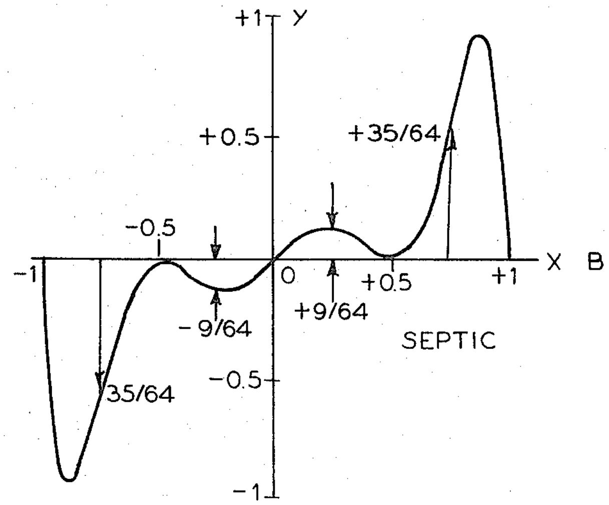
Figure 12:
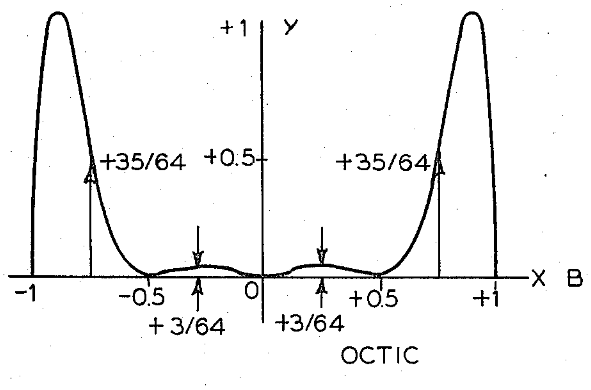

One additional process must be completed before the binary polynomial expression can be used effectively to approximate the values of many transcendental functions. The $B_n$ term has been written in terms of binary $x$ values so that it is a relatively simple matter, by either hand calculation or computer methods, to determine quantities represented by $B_n$. The coefficient term $g_n$ has been described together with the need to insert certain data samples in order to satisfy at least a number of terms of the polynomial expression. However, an additional step is required. Values for the data samples are provided in a form that is equal to the values of $y_0$-$y_8$ as shown in FIG. 7. While the terms of the binary polynomial expression require that the coefficient values be in independent form, that is, it is not sufficient to have the total value of K, C, Q, I, etc., but rather each coefficient must be in separate form. An additional process than must be undertaken in order to provide these coefficients in the independent form.

Referring now to FIG. 5 it is evident that $A = y_0/2$ and $B = y_8/2$ . This form of coefficient notation chosen for the $B_0^*$ and the $B_1^*$ polynomials is ideal for use in interpolating on a terminal straight line by means of digital hardware. As shown it is a relatively simple matter to determine y in terms of the binary sequences of $x$. Note that $y_0$ - $Y_8$ are indicated as points 20 – 28 in FIG. 5.
First iteration for $x = ½$ $$y_1 = 2a + 2b/2 = a + b$$

Second iteration for $x = ¼$ $$y_1 = 2a + (a + b)/2 = a + ½(a + b)$$

or
for $x = ¾$ $$y_1 = (a + b) + 2b/2 = \frac{1}{2}(a + b) + b$$

Third iteration for $x = \frac{1}{8}$ etc.

Thus, it is easy to determine the coefficients for the $B_0$ and the $B_1$ polynomials, given the $y_0$ and $y_8$ data sample points.

There are two methods of determining coefficients for the higher order polynomials. A description of the process for the determination of these coefficients is provided by means of examples for the $B_2$, $B_3$ and $B_4$ polynomials. The first method of solving for these coefficients is by the use of simultaneous equations. Note, however, that there are two ways of setting up the equations, (A) in terms of data samples and (B) in terms of samples and the previously determined coefficients. Listed below are three equations representing the quadratic, cubic and quartic coefficients. All three equations are written in the terms of $y$ values. Thus, we have three simultaneous equations and three unknowns and it is a relatively simple matter to solve for values of K, C, or Q.

| Coefficient | By Data Samples |
|---|---|
| Quadratic | $K = y_4 - \frac{1}{2}(y_0 + y_8)$ |
| Cubic | $C = \frac{1}{2}[y_6 - ]y_2 + \frac{1}{2}(y_0 - y_8)]$ |
| Quartic | $Q = \{\frac{1}{2} y_6 + y_2 - \frac{1}{2}[3y_4 + \frac{1}{2}(y_0 + y_2)]\}$ |

The same three equations for the quadratic, cubic and quartic coefficients have been shown below. In this case the equations have been expressed in terms of y values and previously determined coefficients as well as points A and B.

| COefficient | By Data Samples and Coefficient |
|---|---|
| Quadratic | $K = \frac{1}{4} - (a + b)$ |
| Cubic | $C = \frac{1}{2}(y_6 - y_2 + a - b)$ |
| Quartic | $Q = \frac{1}{2}(y_6 + y_2 + \frac{1}{2}K) - \frac{1}{4}$ |

It is obvious that either set of equations will yield the proper values of K, C and Q. The above methods of definition may be continued to the higher polynomial orders. However, a more efficient approach is available.

Figure 13:
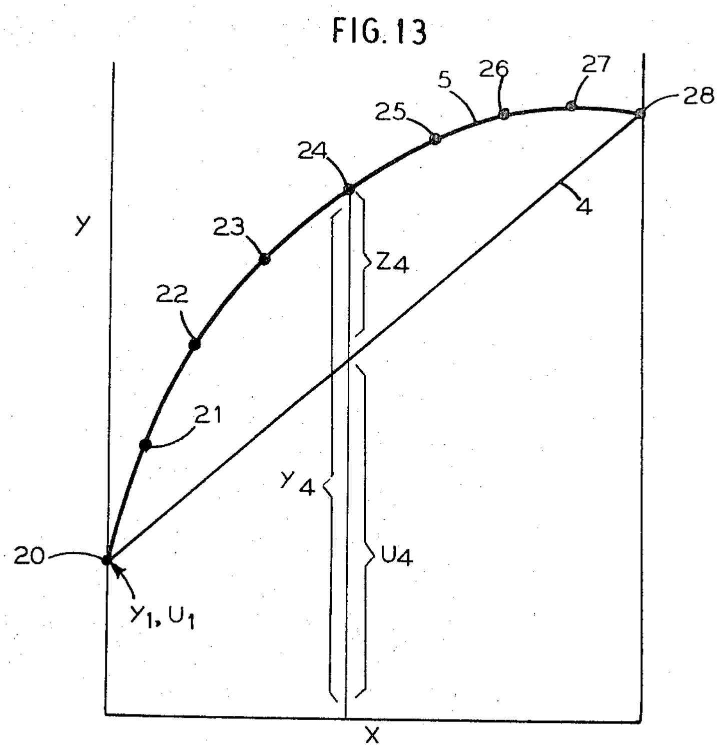
FIG. 13 is a graph of a straight line and the curve of $y = f(x)$ useful in explaining the residual needs system of notation.

By using a different system of notation it is possible to determine the value of the coefficient by an interpolation process. As each exact fit point, or group of points, is obtained, the approximation is interpolated at the next binary base stage and the $y$ values replaced by residual needs values designated $z$. Referring to FIG. 13 the graph of the straight line 1 and the curve $y = f(x)$ are shown together with the $x$ and $y$ axes. The similarities between the graph of FIG. 13 and graphs of FIGS. 1 and 5 should be noted. Points 20–28 inclusive are definition points or data sample points. The $x$ values of these points are equal binary segments of the $x$ axis from 0 to 1 as previously discussed. A $y$ value for each definition point can be divided into two components labeled $z$ and $u$. For example, on point 24 the $y$ value is indicated as $y_4$ and is equal to the sum of $y$ values $z_4$ and $u_4$. Notice that the value $u_4$ was obtained by the linear interpolation of the curve $y = f(x)$ by means of a straight line 4. The values for the other data points can be obtained by a similar process of interpolation as is shown in detail in the figure. The equations for the relationship of these $y$ values are listed in Table 5 below, i.e., $z_4 = 0\ y_4 - u_4$ where $u_4$ is the linear interpolation at $x = \frac{1}{2}$.

TABLE 5

$z_4 = y_4$ - (linear interpolation at $x = \frac{1}{2}$)
$z_2\ y_2$ - (quadratic interpolation at $x = \frac{1}{4}$)
$z_6 = y_6$ - (quadratic interpolation at $x = \frac{3}{4}$)
$z_1 = y_1$ - (quartic interpolation at $x = \frac{1}{8}$)

The natural coefficients can now be defined in terms of the $z$ values which are called "residual needs." Referring to Table 6 below, the natural coefficients K through E, inclusive, are defined in terms of residual need values $z_1$ through $Z_7$.

TABLE 6

Summary of the coefficient definition in the preferred notation of "residual need"

$a = \frac{1}{2}y_0$
$b = \frac{1}{2}y_8$
$K = z_4$
$C = \frac{1}{2}(z_6 - z_2)$.
$Q = \frac{1}{2}(z_6 - z_2)$
$I = 3/14(z_7 - z_1) + 5/6(z_3 - z_5)$
$S\ 3/14(z_7 + z_1) - 5/2\ (z_3 + z_5)$
$P = 4/7(z_7 - z_1) - 4/3(z_3 - z_5)$
$E = 4/7(z_7 + z_1) + 4(z_3 + z_5)$ Note that coefficients $a$ and $b$ continue to be defined in terms of $y_0$ and $y_8$, respectively.

Table 1 listed in column 2 the complete polynomial expressions $B_n$* and in column 3 the preferred coefficient notation. Table 7 shows how each $y$ value is made up from the $g_nB_n$ binary polynomial expression over the first three binary stages of $x$.

TABLE 7

| | | | | | Values of $x$ | | | | | |
|---|---|---|---|---|---|---|---|---|---|---|
| | $-1$ | $-\frac{3}{4}$ | $-\frac{1}{2}$ | $-\frac{1}{4}$ | $0$ | $+\frac{1}{4}$ | $+\frac{1}{2}$ | $+\frac{3}{4}$ | $+1$ | $B$ |
| Polynomial order | $0$ | $\frac{1}{8}$ | $\frac{1}{4}$ | $\frac{3}{8}$ | $\frac{1}{2}$ | $\frac{5}{8}$ | $\frac{3}{4}$ | $\frac{7}{8}$ | $1$ | $B^*$ |
| Linear | $2a$ | $\frac{7a+b}{4}$ | $\frac{3a+b}{2}$ | $\frac{5a+3b}{4}$ | $a+b$ | $\frac{a+5b}{4}$ | $\frac{a+3b}{2}$ | $\frac{a+7b}{4}$ | $2b$ | |
| Quadratic | | $\frac{7}{16}K$ | $\frac{3}{4}K$ | $\frac{15}{16}K$ | $K$ | $\frac{15}{16}K$ | $\frac{3}{4}K$ | $\frac{7}{16}K$ | | |
| Cubic | | $-\frac{7}{8}C$ | $-C$ | $-\frac{5}{8}C$ | | $+\frac{5}{8}C$ | $+C$ | $+\frac{7}{8}C$ | | |
| Quartic | | $\frac{21}{16}Q$ | $Q$ | $\frac{5}{16}Q$ | | $\frac{5}{16}Q$ | $Q$ | $\frac{21}{16}Q$ | | |

TABLE 7 – Continued

| | Values of $x$ | | | | | | | | | |
|---|---|---|---|---|---|---|---|---|---|---|
| | $-1$ | $-\frac{3}{4}$ | $-\frac{1}{2}$ | $-\frac{1}{4}$ | $0$ | $+\frac{1}{4}$ | $+\frac{1}{2}$ | $+\frac{3}{4}$ | $+1$ | $B$ |
| Polynomial order | $0$ | $\frac{1}{8}$ | $\frac{1}{4}$ | $\frac{3}{8}$ | $\frac{1}{2}$ | $\frac{5}{8}$ | $\frac{3}{4}$ | $\frac{7}{8}$ | $1$ | $B^*$ |
| Quintic | | $-\frac{7}{8}I$ | | $+\frac{3}{8}I$ | | $-\frac{3}{8}I$ | | $+\frac{7}{8}I$ | | |
| Sextic | | $+\frac{7}{8}S$ | | $-\frac{1}{8}S$ | | $-\frac{1}{8}S$ | | $+\frac{7}{8}S$ | | |
| Septic | | $\frac{35}{64}P$ | | $-\frac{9}{64}P$ | | $+\frac{9}{64}P$ | | $+\frac{35}{64}P$ | | |
| Octic | | $+\frac{35}{64}E$ | | $+\frac{3}{64}E$ | | $+\frac{3}{64}E$ | | $+\frac{35}{64}E$ | | |
| Total | $y_0$ | $y_1$ | $y_2$ | $y_3$ | $y_4$ | $y_5$ | $y_6$ | $y_7$ | $y_8$ | |

For example, referring to Table 1, under quartic in the column headed "polynomial order," across from quartic has been listed the coefficient term $g_4 = Q$, and the $B_4^*$ term equals $256/3x\ (1 - x)\ (x - \frac{1}{2})^2$. If the value of $x = \frac{1}{8}$, selected for the purposes of illustration and as representing the second binary stage of $x$, is substituted for the value of $x$ in this equations for $B_4^*$ the resulting fraction will be 21/16. It will now be noticed in Table 7 that the factors 21/16 and Q have been listed under the $x$ value $\frac{1}{8}$ opposite the quartic polynomial order. The other components of the table have been developed in the same manner. Notice that at the bottom of the table have been listed the symbols $y_0$ through $y_8$. Expressed in other words, the quartic contribution to $y_1$ is 21/16Q. $y_1$ also equals the sum of all the expressions shown under the value of $x = \frac{1}{8}$.

The derivation of the binary polynomial expression including the development of the coefficients and $x$ dependent factors have been described. Before discussing the "add shift" algorithms, and flow charts which are designed to implement the algorithms, the following significant points regarding the algorithms, flow charts and hardware are listed.

The term algorithms are used herein refers to the common rules of computation in the approximation section of the branch of mathematics normally called numerical analysis.

The operations used in execution of these algorithms are confined to "add" and "shift" only. The add-shift advantage may be employed either to give speed or hardware economy.

In current technology there are three principal approaches to hardware implementation, and selection will be determined by the interpolation time required.

a. Word serial/character serial — uses a limited number of shift registers and one time-shared bit adder.
b. WOrd parallel/character serial — uses multiple shift registers each provisioned with a single bit adder.
c. Word serial/character parallel — uses sequential parallel transfers to one time-shared parallel adder.

Hardware implementation at a given algorithm order uses the same hardware and same microprogram for all functions to which the technique of this invention is applicable. Function-to-function difference is confined to the initial conditions entered, i.e., the binary polynomial coefficients.

The interpolation hardware will execute many of the operations needed for the algebraic determination of binary polynomial coefficients.

Hardware designed for general purpose polynomial approximation will also provide accurate mathematical functions through the addition of a limited read only memory facility.

Where binary polynomial coefficients are to be determined from sample data, it is advantageous to derive one or two additional coefficients beyond the polynomial hardware. These additional coefficients may then be telescoped into the lower order coefficients by means of a simple algebraic process. The resulting accuracy deficiency, relative to Chebyshev is then very small, as described hereinafter.

When the binary polynomial coefficients have been entered for a given function the algorithm will operate to give either the function or its inverse, e.g., since stored gives sine and arcsine.

An incidental but useful property of the algorithms is that multiplication and division are automatically available as they constitute single term first order polynomials in forward and inverse interpolation, respectively.

The algorithms facilitate solution of multi-parameter problems where the problem is satisfied by storage and interpolation of an "$n$" dimensional hyperspace. Coefficient determination for definition of the hyperspace is a relatively simple task in the binary polynomials. This approach is particularly effective when rapid interpolation is needed for a slowly changing hyperspace. Hyperspace interpolation requires a single algorithm hardware used in iterative mode.

When implemented in serial MOS hardware, a very economic solution arises suitable for use in programmable calculators, electronic instruments, and data loggers.

Parallel hardware implementation yields very rapid interpolation suitable for mathematical computer support. This may be provided either by way of a peripheral module or as a hard wired option within the computer.

Both coefficient determination and function interpolation are possible in real time.

A small computer, when supported by a module providing this polynomial facility, is able to handle a wide range of functioning problems in real time.

The binary polynomial series is defined up to the 8th order for $x$ ranges 0 to −1 and −1 to +1. These polynomials provide a high degree of convergence and function approximation but must, of course, be less convergent than the Chebyshev polynomials. In the average case, the binary accuracy loss is one bit at the 4th order and two bits at the 6th order.

In order to explain the linear interpolation and develop the algorithms and flow charts we will start with the interpolation of the first order polynomials $B_n^*$ and $B_1^*$. The equations for these polynomials are:

$$y = (b + a)B_0^* + (b - a)B_1^*$$
$$= b + a + (b - a)(2x - 1)$$
$$= 2a + (b - a)2x.$$

Figure 14:
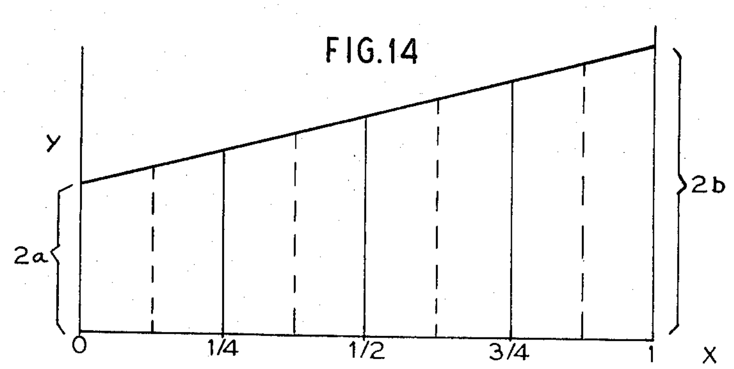
FIG. 14 is a graph showing the relationship of $y$, $x$, $a$ and $b$.

The problem requires that we determine the value of $y$ at $x = 1/4$ and $x = 3/4$. FIG. 14 shows the relationship of $y$, $x$, $a$ and $b$, in a graphical form. In this system of notation, $y_{1/2}$ may be read the value of $y$ for $x = 1/2$. Starting with the value of $y$ for $x = 0$ and for $x = 1$, other values of $y$ may be determined for any binary stage of $x$ through a succession of interpolation steps. The first interpolation includes the algebraic processes of adding $2a$ to $2b$ and the division of the total by 2. Thus, $y_{1/2} = (2a = 2b/2)$ or $y_{1/2} = a + b$. Thus, the $y$ value, for the straight line defined by the two binary polynomials $B_0^*$ and $B_1^*$ at the point $x = 1/2$ is equal to $a + b$. We can not either interpolate for the $x$ value 1/4 or for 3/4. That is, if we wish to find the value of $y$ where $x$ is 3/8 we must first interpolate at the $x$ value 1/4. The interpolation equations for $y_{3/4}$ and $y_{1/4}$ are shown below.

$$y_{3/4} = y_{1/2} + 2b/2 = 1/2 y_{1/2} + b$$

$y_{1/4} = 2a + y_{1/2}/2 = a + 1/2 y_{1/2}$ Notice that in the equation for $y_{3/4}$, the value of $y_{1/2}$, which was found in the first interpolation, was substituted for $2a$, while in the equation $y_{1/4}$, the value $y_{1/2}$ was substituted for 2b. The above process is continued until the searched for dependent variable $y$ is found for the independent variable $x$.

Figure 15:
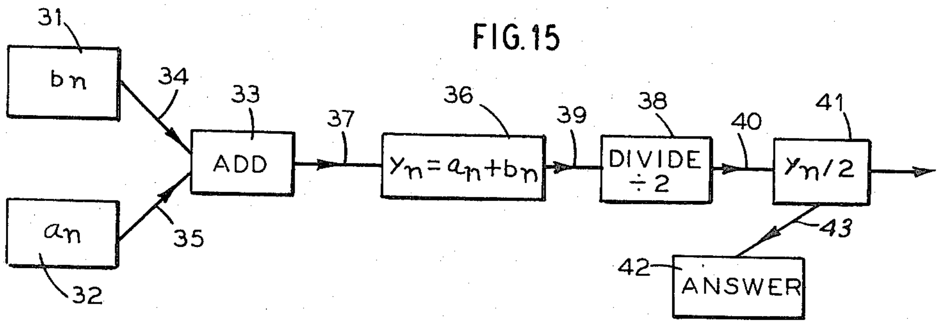
FIG. 15 is a simplified block diagram of the digital functions required to perform an interpolation of a straight line.

The process of successive interpolation is readily executed by using the iterative action of digital apparatus. FIG. 15 shows a simplified block diagram of the digital functions required to perform an interpolation of a straight line drawn between the points $a$ and $b$. In a storage register 31 is inserted a binary number representing the $y$ value of the point $b$. In the same fashion a binary number for the $y$ value of point $a$ is inserted into a shift register 32. The two shift registers are connected to an adder 33, which performs the function of addition of the information received on paths 34 and 35. The output of the adder 33, which now contains the sum of the $y$ values $a$ and $b$, is connected to a shift register 36 by means of a path 37. Shift register 36 stores a single value $y_n$, which is equal to the sum $a_n + b_n$. The output of the shift register 36 is connected by path 39 to a shift register 38 which performs the function of division by 2. The output of unit 38 is connected by path 40 to shift register 41 which now contains the value $y_n/2$ for later use. The answer, $y_n/2$, is transferred to the output device 42 through path 43.

An important advantage of this technique resides in the simplicity of the elements employed in the calculations, and in the nature of the calculation temselves. The algorithm is devised in a manner which permits the process to be carried out and an answer arrived at by addition and division by powers of two, and the division by two can be accom-plished simply by shifting the register in the proper direction (typically from left to right) one place at the appropriate time. The "overflow" bit resulting from this "overshift" is then inhibited to prevent unwanted recirculation of a stray bit. Thus the power of the invention is greatly enhanced by the simplicity by which division of binary values by powers of two can be effected by appropriately controlled shift register operation.

The apparatus described in reference to FIG. 15 is satisfactory for performing a single interpolation. In order for the apparatus to perform multiple interpolation in the form of an automatic iterative routine, it is necessary to add two further functions. First an additional shift register is added in which to insert the initial condition of $x$ in binary form. Secondly, apparatus is added for replacing either point value $a_n$ or $b_n$ with the value of the new point $y_n/2$ stored in register 41.

Figure 16:
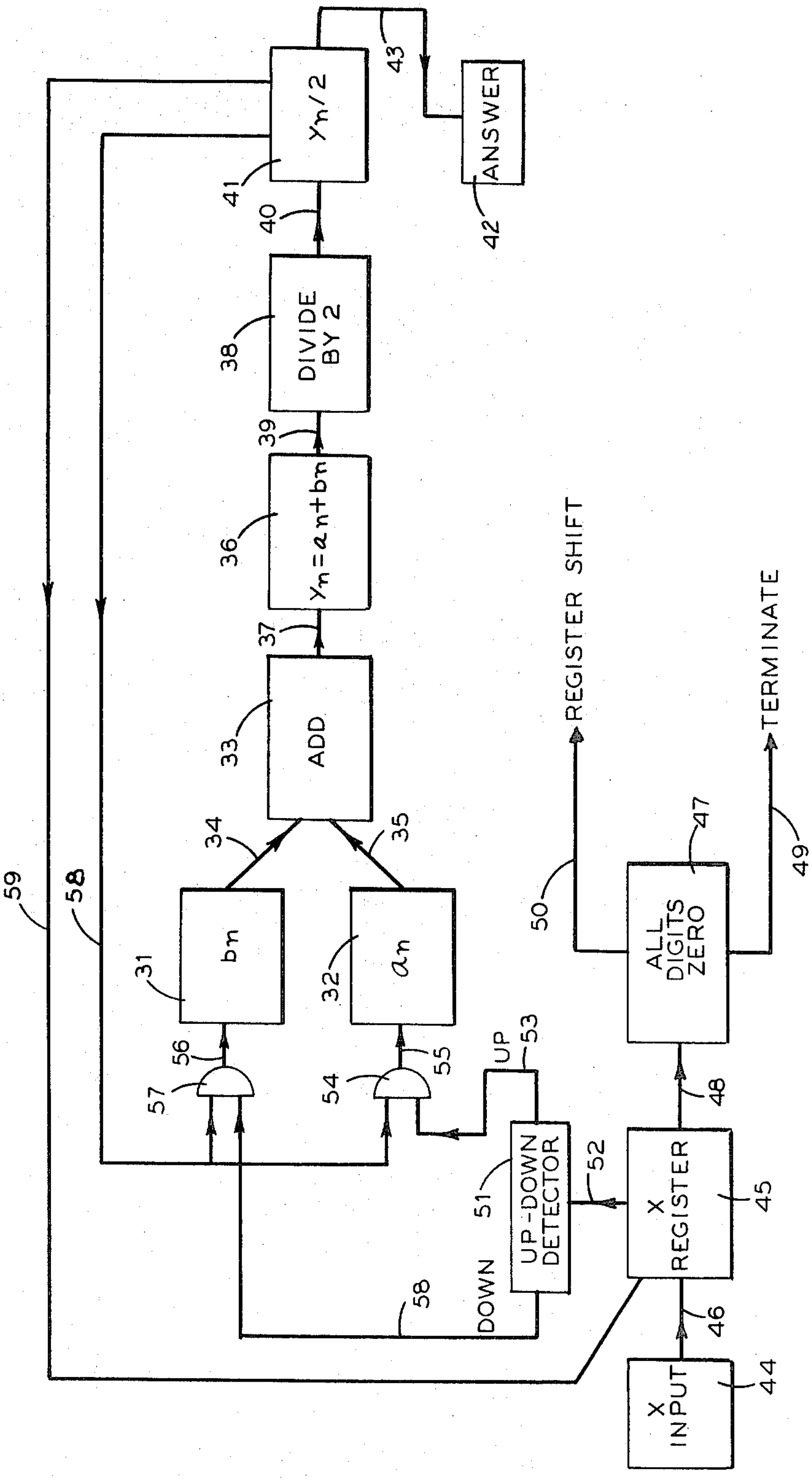
FIG. 16 is a simplified block diagram of the apparatus required to perform a linear iterative interpolation.

Referring to FIG. 16 there is shown all of the apparatus required to perform linear iterative interpolation. An input device 44 is used for inserting the $x$-value, in binary form, into a shift register 45 through path 46. The output of shift register 45 is connected to a decision-making element 47 through path 48. The decision-making element 47, i.e., comparator, is comprised of comparison circuitry or other logical elements for determining whether the $x$ value stored in shift register 45 is all zeroes. That is, if the $x$ value in shift register 45 is such that all digits are zero the decision-making circuit 47 will terminate the operation of the functions shown in the block diagram. If, however, the decision-making element 47 determines that the number held in shift register 45 is not all zeroes an impulse is transmitted by means of a path 50 to shift the proper shift registers, thus starting the next interpolation process. A second decision-making element 51 is connected through a path 52 to the $x$ shift register 45. The comparator 51, which is connected to shift register 45 through the path 52, determines whether a new point value, from shift register 41, is to be inserted into shift register 31, replacing the point value $b_n$, or whether it shall be inserted into shift register 32, for the point value $a_n$. The comparator 51 makes the decision on the basis of whether the most significant bit of the value held in the $x$ register 45 is a zero or one. If the comparator detects a 1, for the most significant bit instructions are given through a path 53 to a gate 54 and a path 55, which permits the value $y_n/2$ from shift register 41 to enter the shift register 32 by means of a path 55. Similarly, if the comparator 51 detects a zero, a gate 57 is enabled, through a path 58, permitting the signal $y_n/2$ from shift register 41 to enter the $b_n$ shift register 31. Upon completion of the summing operation by the arithmetic units 33 and 38, a new point value is inserted into shift register 41. A signal generated by the shift register 41, indicating that a new point value has been stored, is transmitted by path 59 to the $x$ shift register 45, instructing the register to start the next interpolation. This process is repeated as many times as necessary or until the comparator 47 detects all zeroes, in the $x$ register 45, at which time the terminating signal is produced on path 49. Thus, the entire iterative routine is controlled by the shift register 45.

The combined functions shown in FIG. 16 are for the purpose of providing iterative linear interpolation. The same process of iterative linear interpolation is shown by the flow chart of FIG. 17 in a preferred system of notation. Thus, the flow chart of FIG. 17 is the algorithm for linear interpolation and implements the binary polynomial expression:

$$y = (b + a)B^*_o + (b - a)B^*_1$$

for the $x$ range 0 to 1.

Figure 17:
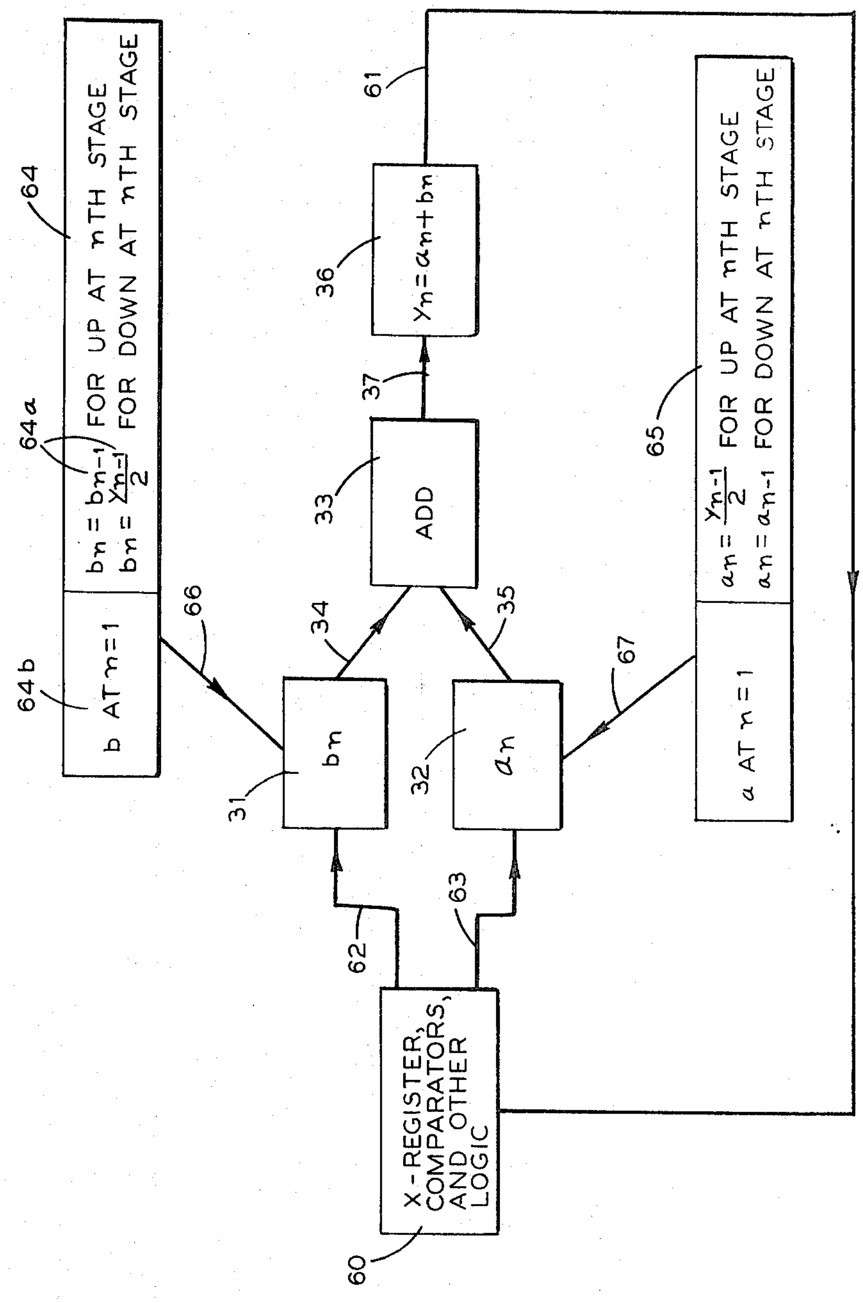
FIG. 17 is a flow chart of the same iterative linear interpolation shown in the preferred system of notation.

Referring now to FIG. 17, $y$ values of points $a$ and $b$ are inserted into shift registers 31 and 32, respectively. The adder unit 33 adds the $y$ values of points $b$ and $a$, which have been transmitted through paths 34 and 35, respectively. The sum of the $y$ values for points $b$ and $a$ is entered into shift register 36 through path 37. Note that other processes required to complete the linear interpolation have, for the sake of simplicity, been combined in the common logic box 60. That is, the other functions, including $x$ inputs, $x$ register, digit determination, and up-down detector plus certain arithmetic functions which are common to all of the algorithms have been combined in logic box 60. The flow of both data information and logic signals into and out of logic box 60 is shown by signal paths 61, 62 and 63. Boxes 64 and 65 indicate the staging and initializing conditions for shift registers 31 and 32, respectively. That is, equation 64*a* may be read, "if the nth iteration indicates an up-process, $b_n$ is to be replaced by $b_n - 1$." In the same fashion, "if the nth iteration the down process is indicated, the $b_n$ should be replaced by $y_n - ½$." The initializing condition, for the insertion of data into a particular register, is defined in terms of $n$, where $n = 1$ for the first mid-interpolation of the $x$ range, i.e., $x = ½$ for the $B_n^*$ polynomials. Equation 64*b* indicates that at $n = 1$, or the first iteration, the value of $b$ should be inserted into the shift register 31. The staging equations and initializing conditions, for shift register 32 for point $a$, are contained in box 65. The insertion of the staging and initializing conditions from box 64 to shift register 31 and from box 65 to shift register 32 is accomplished through paths 66 and 67, respectively.

The block diagram of FIG. 16 and the flow chart of FIG. 17 both generally indicate a word-serial, character parallel implementation. With the exception of the $x$ register any form of serial or parallel implementation is satisfactory for operation of the adder units or storage registers. The $x$ register, however, must be serial by character. Equivalent flow charts for serial operation may readily be derived from the flow charts provided.

Figure 18:
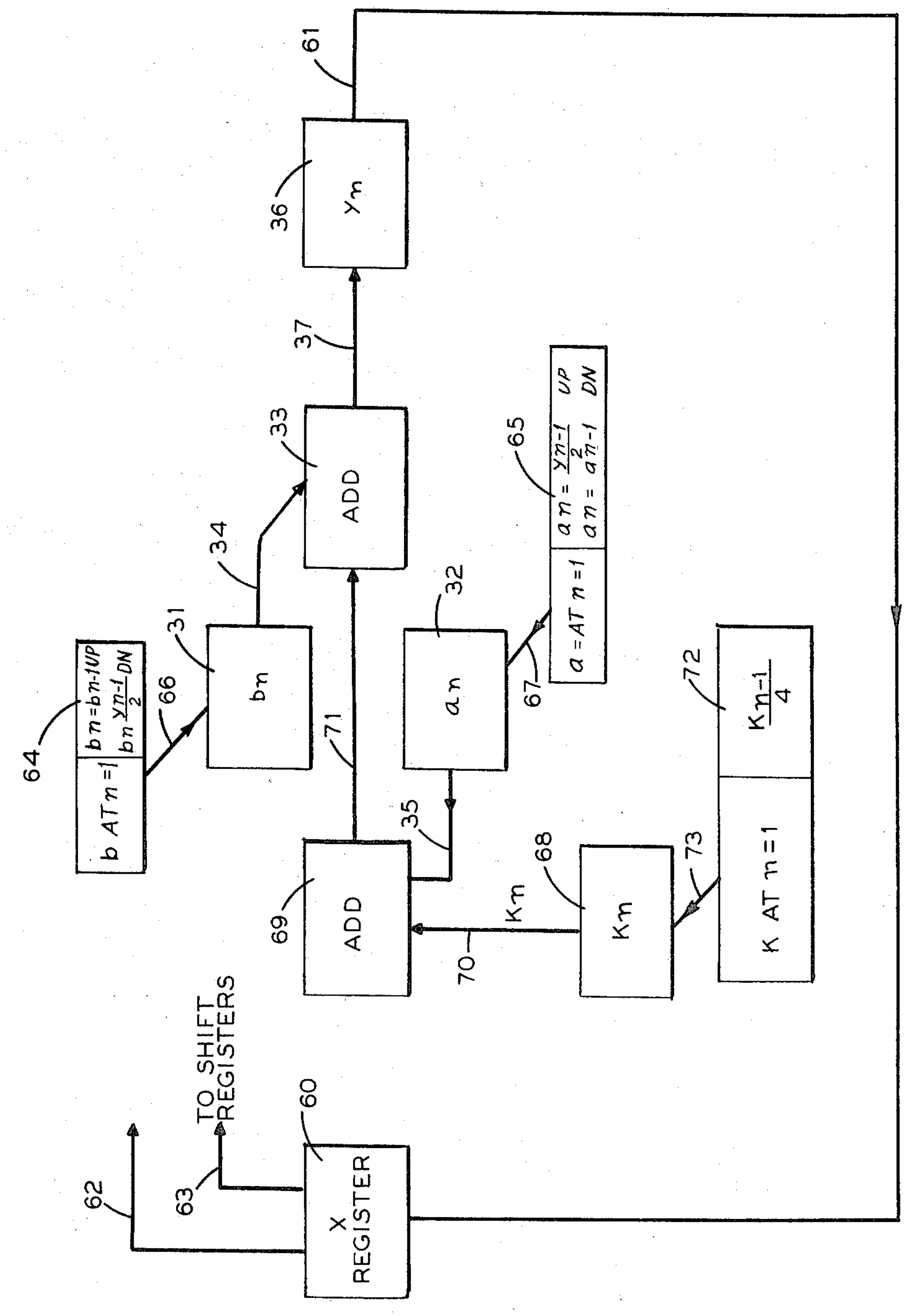
FIG. 18 is a flow chart of the apparatus that will implement the binary polynomial equation with a quadratic correction term.

In FIG. 18 is shown the flow chart for the quadratic algorithm. This flow chart will implement the binary polynomial equation:

$$y = (b + a)B_0^* + (b - a)B_1^* + KB_2^*$$

In the flow chart of FIG 18, notice that the functions that perform the linear interpolation as described in reference to FIG. 17 remain the same, that is, shift registers 31 and 32 contain the $y$ values for points b and a which are summed by adder 33 and transferred to shift register 36. An additional shift register 68 has been added for the purpose of holding the coefficient value K. The output of shift register 68 is connected to a second adder 69 through path 70. The new adder 69 is for the purpose of summing the $y$ values of point $a$, with the value of the coefficient K which is held in shift register 68. The adder 69 is connected to the first adder 33 through path 71. The staging and initializing conditions for shift register 68 are provided in a box 72 and inserted into shift register 68 through a path 73. Staging and initializing condition for shift registers 31 and 32 which hold the $y$ values of $b_n$ and $a_n$, respectively, are provided in boxes 64 and 65 and remain as described for the linear interpolation algorithm. The $x$ shift register, which controls the iterative routine of the quadratic algorithm, together with comparators and other logic, are contained in box 60. The y value of point $a_n$ is now inserted through path 35 to adder 69.

It will be realized that adders 33 and 69 have been shown symbolically and that in an actual process the adding operations can be combined into the functions of a single arithmetic unit of a standard computer or the combined functions may be provided by other known techniques. FIG. 18 shows that the information carried in path 37 is the sum of the data on path 34 and path 71. Similarly, the information on path 71 is the sum of the data on paths 35 and 70.

Figure 19:
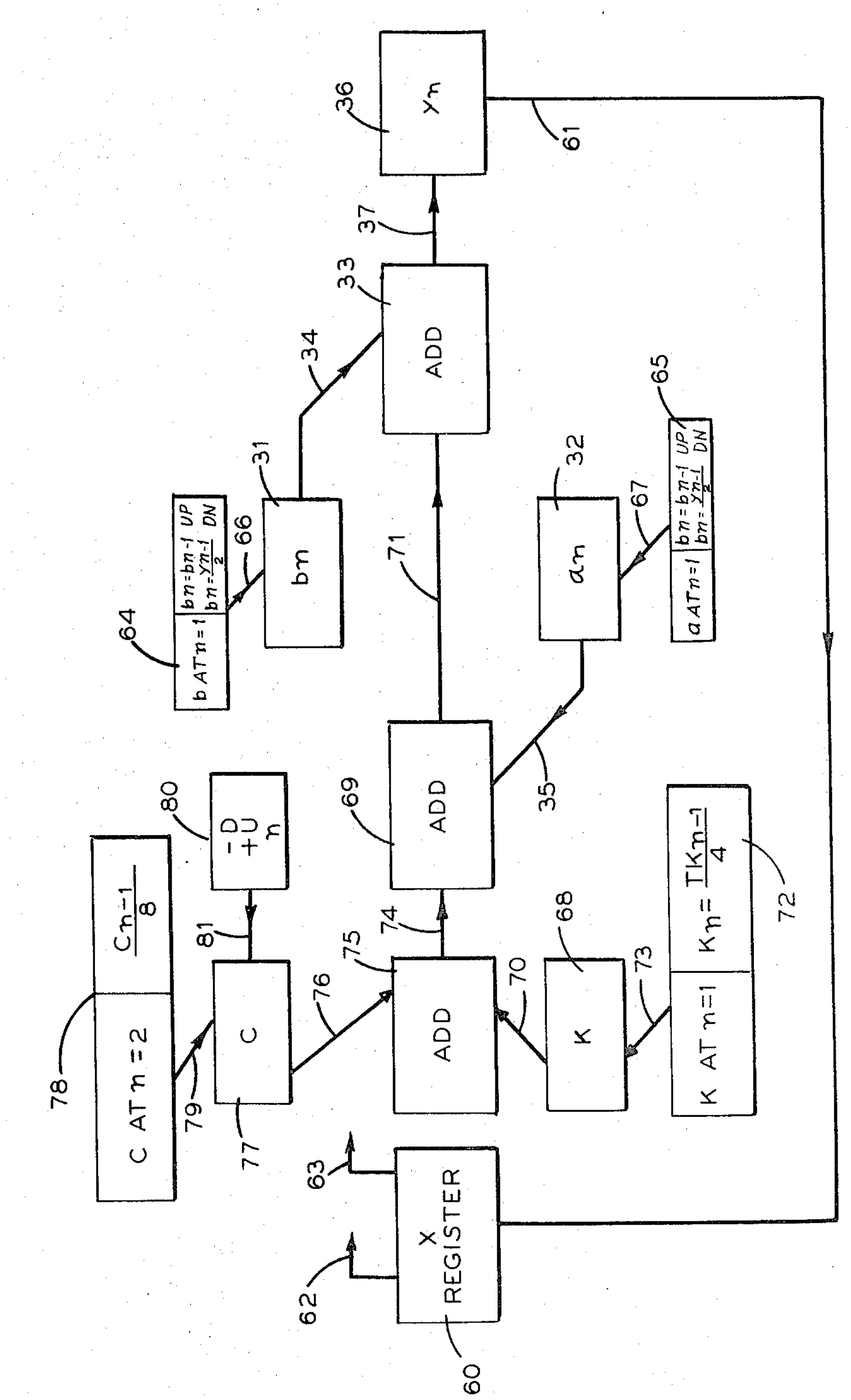
FIG. 19 is a flow chart of the apparatus that will implement the binary polynomial including the cubic correction term.

In the cubic algorithm, the flow charts already described will reiteratively interpolate the first three polynomial orders and will also provide quadratic approximation for use by the cubic polynomial. In FIG. 19 is shown the flow chart for the cubic algorithm which will implement the binary polynomial:

$$y = (b + a)B_0^* + (b - a)B_1^* + KB_2^* + CB_3^*$$

Before continuing with the discussion of flow chart 19 relating to the cubic algorithm, additional notations which will be required for the higher order algorithms, including the cubic, will be described.

Starting with the cubic algorithms, and continuing through all of the algorithms of higher order, certain terms will require a polarity sign (indicating addition or subtraction) providing direction at the nth stage. The notation is:

$$\begin{bmatrix} -D \\ +U \end{bmatrix}_n$$

This notation indicates that in the nth operation, a "down" process will be subtraction, and an "up" operation will be addition. A similar notation is used for the quartic and higher order algorithms. The polarity is determined by the direction of the previous, or $n - 1$, stage. The notation used is:

$$\begin{bmatrix} -D \\ +U \end{bmatrix}_{n-1}$$

The notation used to indicate the content of the coefficient register and the symbols used to indicate the addition process are described below using the cubic algorithm as an example. The total cubic correcting coefficient is identified as $TC_n$ where $TC_n$ is equal to the contents of the cubic register plus the residual need. The flow charts will have the following notation:

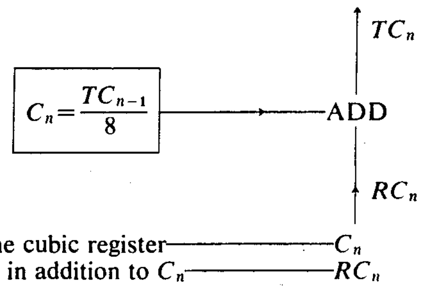

Contents of the cubic register —— $C_n$

Residual need in addition to $C_n$ —— $RC_n$

Total of above —— $TC_n$

The contents of the cubic coefficient shift register, at the next iteration, or the $n+1$ iteration, is given by:

$$C_{n+1} = TC_n/8$$

Certain transfer terms are required for higher order algorithms. For example, quartic and higher order algorithms call for terms not present in any of the available registers at the nth stage. As shown in the flow chart for the quartic algorithm, FIG. 20, the value $8Q_n$ is required. This value, however, was previously calculated and available in a shift register. The following equation shows that the proper value of $Q_n$ for any iteration was available during previous iterations:

$$Q_n = Q_{n-1}/16 \text{ is obtained in shift by } Q_{n-1} \rightarrow Q_{n-1}/2 \rightarrow Q_{n-1}/4 \rightarrow Q_{n-1}/8 \rightarrow Q_{n-1}/16$$

which may be re-written $16Q_n \rightarrow 8Q_n \rightarrow 4Q_n \rightarrow 2Q_n \rightarrow Q_n$ The division by 16 required to calculate $Q_n$ from $Q_{n-1}$ may easily be accomplished by inserting extra pulses into the coefficient Q shift register. Thus division by $2_n$ may be accomplished by iteritive shifts (division by 2) of the selected shift register. Details of this iteritive division by 2 process is provided with reference to FIG. 19*a*.

Temporary storage registers are required for the higher order algorithm for the storage of partial sums, in the addition sequence. These temporary storage registers have been shown on the flow charts. Such registers may be time-shared.

Referring to FIG. 19, the flow chart for the cubic algorithm, notice that all $x$ functions, shift registers, staging and initializing conditions, including the interconnecting paths that were shown and described with reference to the quadratic algorithm and flow charts shown in FIG. 18 are still used without change. Shift register C, an additional adder, initializing and staging conditions for C, and interconnecting paths have been added. As shown, a path 74 interconnects a new adder 75 with adder 69. Path 74 contains the sum of the data on paths 70 and 76. A shift register 77 contains the staging and initializing conditions shown in a box 78 which is inter-connected to the shift register 77 by means of a path 79. The polarity information indicating whether shift register 77 should add or subtract is contained in a box 80 in the notation form previously described and is inter-connected to shift register 77 by a path 81.

It will be seen that the correction factors (K,C,Q, etc.) are initially entered into their respective shift register in binary form. Each register is then shifted to divide the factor, with the other contents of the register by the factor of two associated with that register.

Figure 20:
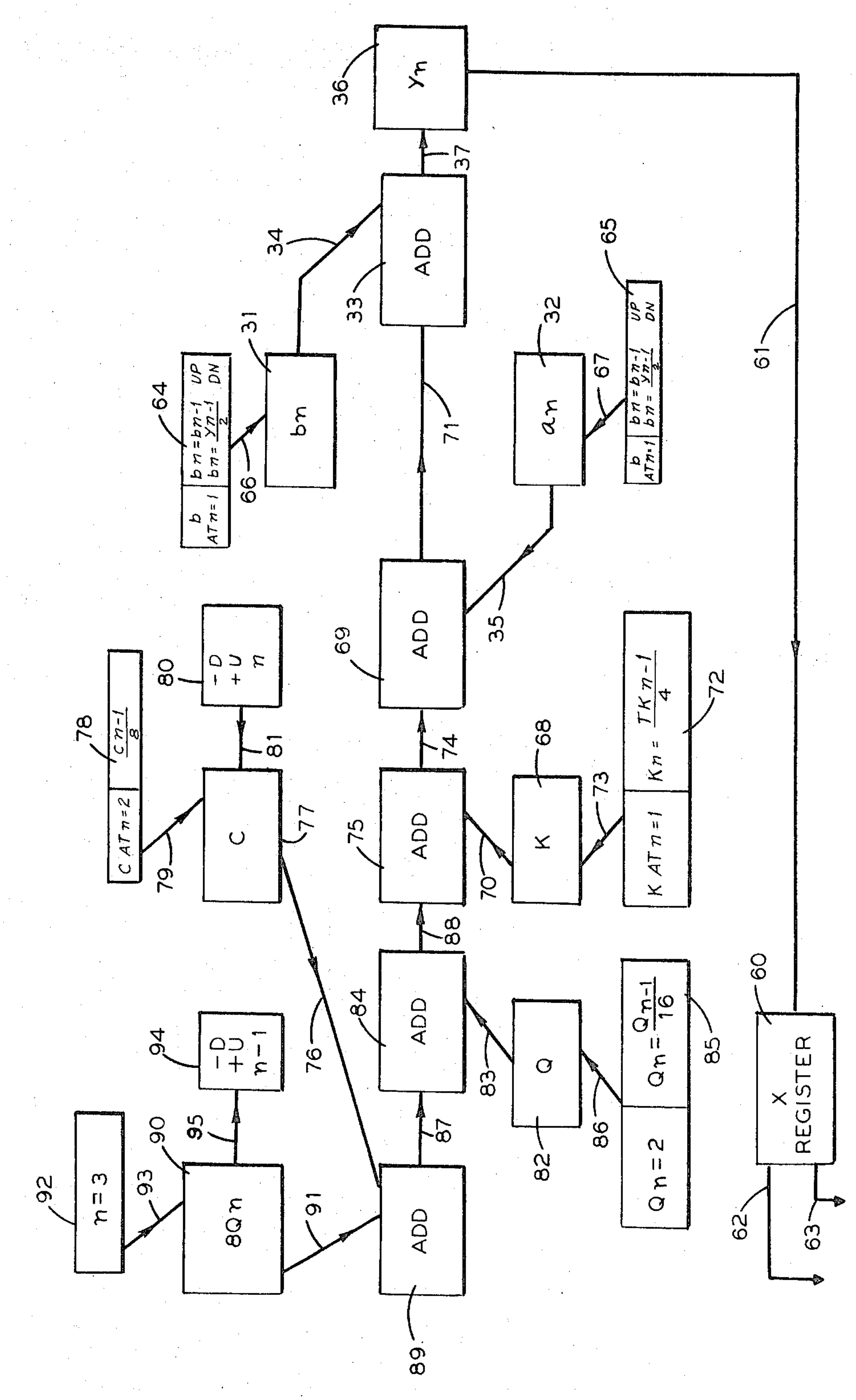
FIGS. 20–21 and 22 are flow charts of the apparatus for implementing the binary polynomial including quartic and higher order terms.

In FIG. 20 there is shown the flow chart for the quartic algorithm which will implement the binary polynomial expression:

$$y = (b+a)B_0^* + (b-a)B_1^* + KB_2^* + CB_3^* + QB_4^*$$

The apparatus shown and described with reference to FIG. 19 is employed in its entirity in the flow chart of FIG. 20. One modification to the existing circuitry is that the contents of the cubic coefficient shift register 77 which was originally inserted into adder 75 is now inserted into a new adder.

The quartic coefficient is held in a shift register 82 and transferred through a path 83 to an adder 84. The staging and initializing conditions for the quartic shift register 82 are shown in a box 85 and inserted through a path 86 to shift register 82. The sum of the data transmitted to adder 84 through paths 83 and 87 is transmitted by a path 88 to adder 75. The cubic coefficient held in shift register 77 is transmitted through path 76 to an adder 89. As discussed previously the higher order polynomials require certain transfer terms. The transfer term $8Q_n$ is held in a shift register 90 and transferred through a path 91 to adder 89. The initializing conditions for shift register 90 are given as $n=3$ in a box 92 and transferred through a path 93 to shift register 90. Polarity signs, in the format previously described, are provided, for shift register 90, in a box 94 and transferred through a path 95.

Figure 21:
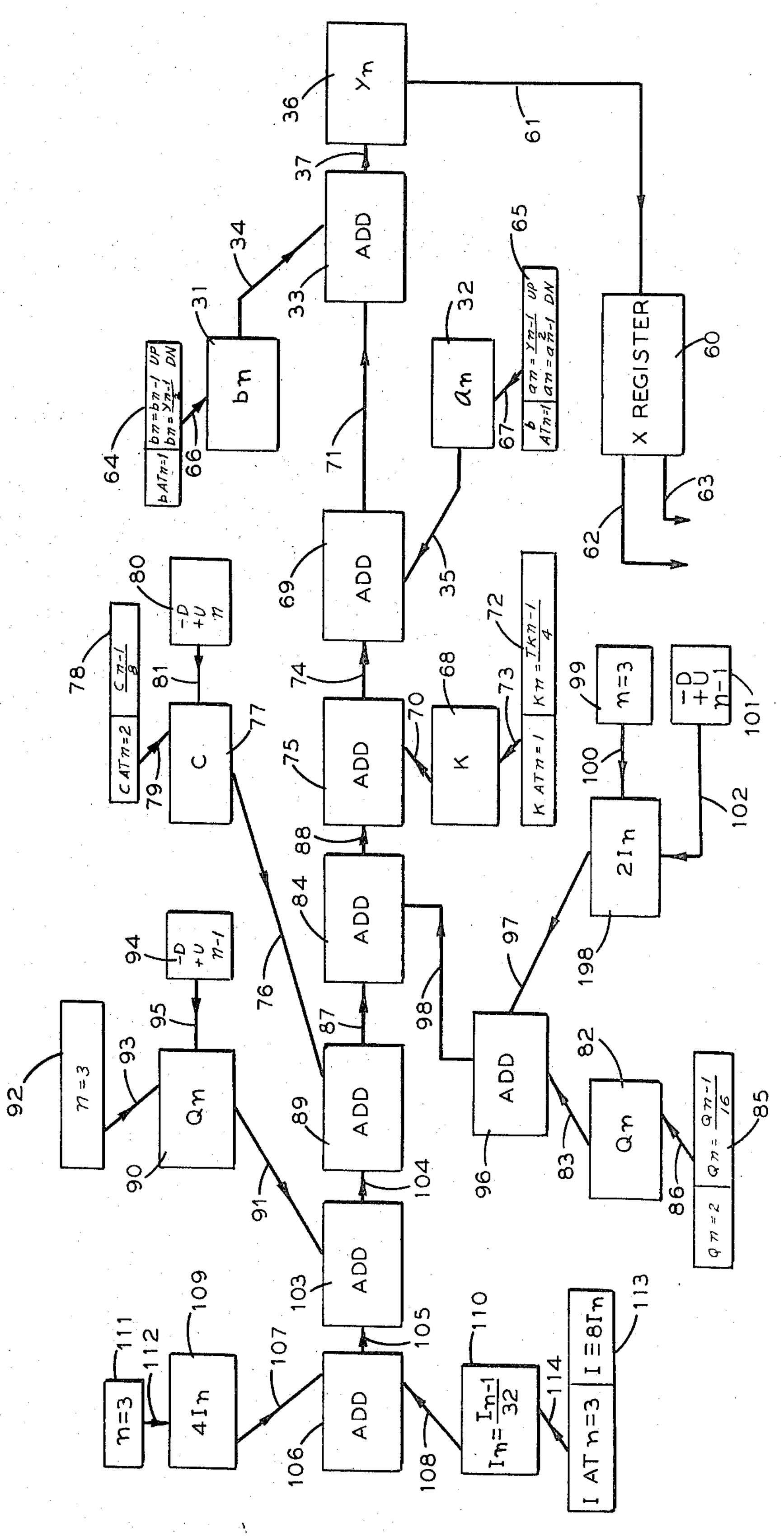

In FIG. 21 there is shown the flow chart for the quintic algorithm which will implement the binary polynomial expression:

$$y = (b+a)B_0^* + (b-a)B_1^* + KB_2^* + CB_3^* + QB_4^* + IB_5^*$$

The apparatus shown and described with reference to FIG. 20 is employed in its entirity in the flow chart of FIG. 21. Two modifications to the existing circuitry of FIG. 20 have been made. The contents of shift register 90, which was originally inserted into adder 89, is now being inserted into a new adder. Secondly, the contents of shift register 82, which was originally inserted into adder 84, is now inserted into a new adder.

The quartic coefficient held in shift register 82 is entered through path 83 into an adder 96. The sum of the information held on paths 83 and 97 is entered into adder 84 through a path 98. The transfer term $2I_n$ is held in a shift register 198 and transferred through a path 97 to adder 96. The initializing condition for shift register 98 is held in a box 99 and transferred to the shift register through a path 100. The polarity information, indicating whether the contents of shift register 98 should be added or subtracted, is contained in a box 101 and transferred through a path 102 to shift register 98.

The contents of shift register 90 are transferred through path 91 to an adder 103. Path 104 which interconnects adders 89 and 103 contains the sum of the information on paths 91 and 105. Path 105 interconnects an adder 103 with adder 106. Path 105 contains the sum of the information contained in paths 107 and 108. An adder 106 is connected to shift registers 109 and 110 through paths 107 and 108, respectively.

Shift register 109 contains the transfer term $4I_n$. The initializing condition is $n=3$, which is contained in box 111 and transferred through path 112.

Shift register 110 contains the coefficient $I_n$. The staging and initializing conditions are contained in a box 113 and are transferred to shift register 110 through a path 114.

Figure 19A:
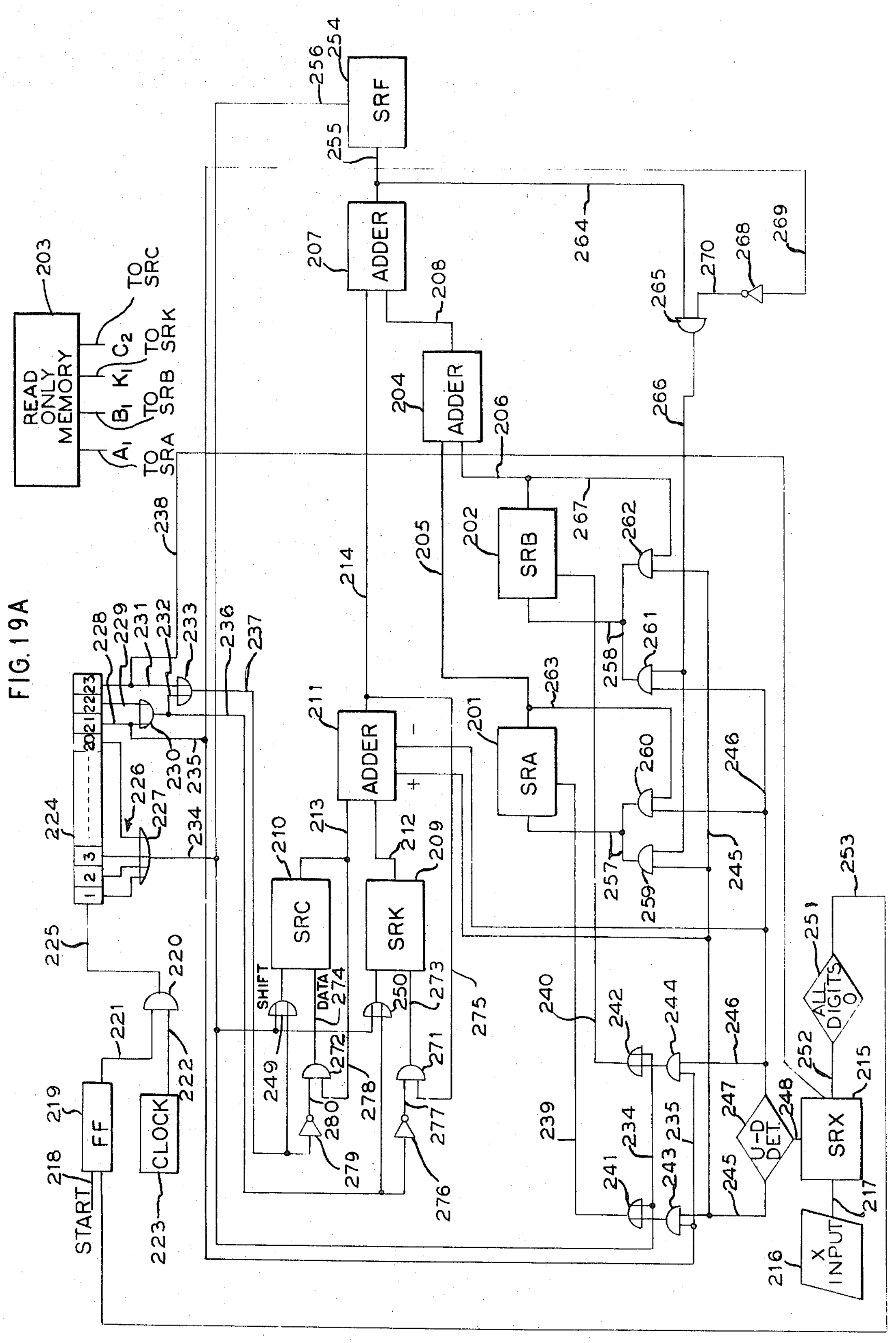
FIG. 19A is a block diagram of the apparatus to implement the binary polynomial with the cubic correction term including the timing and control logic.

FIG. 19*a* is a block diagram showing the timing and control logic for the cubic algorithm which was previously described in relation to FIG. 19. For the sake of clarity, initializing conditions, up-down directions, and polarity have been omitted. Standard symbols have been used for "AND gates," "OR gates" and "inverting amplifiers." "SR" stands for shift register and "SRA," for example, is the shift register containing the value of the point A. The block diagram shows the basic functions including the shift registers for points A and B and for coefficients K and C. Also shown is the control shift register SRX into which the value of X is inserted representing the X value to be searched for as well as the ring counter, clock and other timing and control gates.

Shift registers 201 and 202 contain the values of points A and B respectively which are obtained from a read-only-memory 203. Shift registers 201 and 202 are connected to an adder 204 through paths 205 and 206. The sum of the information contained in paths 205 and 206 is inserted into an adder 207 through a path 208.

In a similar fashion the coefficients K and C are inserted into their respective shift registers 209 and 210. The outputs of shift registers 209 and 210 are inserted into an adder 211 through paths 212 and 213 respectively. Path 214, which interconnects adders 207 and 211, contains the sum of the information on paths 212 and 213.

The X value is inserted into a shift register 215 by means of an input device 216 and an interconnecting path 217.

Timing for the shift of the shift registers, as well as data flow into the shift registers, is under the control of the ring counter, clock, and a series of 2 legged "AND" or "OR gates." A start signal is applied through path 218 to a flip-flop 219. The output of flip-flop 219 is connected to an AND gate 220 through path 221. The second leg of AND gate 220 is connected through path 222 to a clock generator 223. Thus the output of gate 220 which is connected to a ring counter 224 through path 225, contains a clock signal during the period while flip-flop 219 is in the ON state.

A ring counter 224 comprises 23 different stages which count in sequential order starting with stage 1. In the block diagram, for the sake of clarity, stages 4 through 19 have been omitted, but it will be understood that stages 1 through 20 inclusive are connected through paths shown generally as 226 to an OR gate 227. Paths 228 and 229 connect stages 21 and 22 of the ring counter to two legged OR gate 230. The 2 legs of an OR gate 233 are connected to the final stage of the ring counter 223 and the output of the ring counter is contained on 5 paths indicated as 234, 235, 236, 237 and 238 which may be described as follows: path 234 contains time periods 1 through 20 inclusive, path 235 contains time period 21, path 236 contains time periods 21 and 22, path 237 contains time periods 21, 22 and 23 and finally path 238 contains time period 23 only.

Shift register 201, containing the value for point A, is instructed to shift through a path 239, OR gate 241, and path 234, while shift register 202, containing the value of point B, is shifted by signals contained on lines 240, OR gate 242 and path 234. Thus shift registers 201 and 202 always shift during periods 1 through 20 inclusive. Note however, that an additional shift period 21 is applied to shift registers 201 and 202 through OR gates 241 and 242 and AND gates 243 and 244 respectively. Thus when AND gate 243 or 244 is "enabled" by signals through either path 245 or 246, an extra shift pulse is transmitted to either shift register 201 or 202. The object of this additional shift will be described hereinafter. The decision as to whether shift register 201 or 202 should be shifted an extra time is made by a decision making comparator 247. Comparator 247 is operated in accordance with signals received through a path 248 from shift register 215.

In a generally similar fashion, shift registers SRK and SRC are always shifted during periods 1–20 by means of signals on path 234 and OR gates 249 and 250, i.e., signals on path 234, applied to OR gate 249, shift the register 210 while the same signals shift the register 209 through OR gate 250. In addition, shift periods 21, 22 and 23, applied through line 237, to OR gate 249, shift the shift register 210, while periods 21 and 22 on line 236, are applied through OR gate 250 to shift the shift register 209.

Time period 23 is applied through line 238 to X register 215. As described originally, the value of X is inserted through input device 216, through path 217, to register 215 and as long as the contents of shift register 215 are not "0" the operation continues in an iterative fashion. If the value in the X register becomes all "O" a decision making element 251, which is connected to register 215 through path 252, causes a terminate signal to be applied to the flip-flop 219 through path 253. A shift register 254, which is identified as SRF, and contains the answer we are searching for, is connected from adder 207 through path 255. SRF is shifted through path 256 from ring counter 224 during time periods 1 through 20 inclusive.

In the preceding paragraphs we have described the operation of the ring counter and its function to control the shifting of the various registers through AND and OR gates. We have not however been concerned with the flow of data into and out of the various registers and adders. We will now discuss data flow and its control by the ring counter.

Data is applied to shift register 201 and 202 through paths 257 and 258 respectively under the control of AND gates 259, 260, 261 and 262.

Data for shift register 201 may be obtained from one of two sources. It may be recirculated from the output of shift register 201 through path 263 into gate 260, or it may be obtained from the output of adder 207 through a path 264, a gate 265, and a path 266 through a gate 259. In a similar fashion data may be fed into shift register 202 from either one of two sources. Data may be recirculated from shift register 202 by means of a path 267 and gate 262 or alternatively data may be obtained from path 266 through gate 265. The element which makes the decision as to the data being supplied to shift register 201 and 202 is made by comparator 247 under the control of shift register 215. Note that data is prevented from flowing from path 264 to either shift register during time period 21 by means of an inverting amplifier 268 and paths 269 and 270.

Data is inserted into shift register 209 and 210 through AND gates 271 and 272 and paths 273 and 274 respectively under the control of the ring counter. The output of adder 211 is supplied to an AND gate 271 through a path 275. The signals applied from the ring counter, through path 236 and an inverting amplifier 276 and a path 277, disables gate 271 during periods 21 and 22.

Data from shift register 210 is recirculated through a path 278, through gate 272, to register 210. Signals applied through path 237 from the ring counter to an inverting amplifier 279 and a path 280, disables AND gate 272 during time periods 21, 22 and 23.

In operation the special functions of the control circuitry of FIG. 19a operates as follows. In the example of the cubic algorithm shown, we have selected an accuracy of 16 bits with 4 additional bits for rounding errors. Thus registers SRA, SRB, SRK and SRC have a capacity of 20 bits while registers SRX and SRF have a capacity of 16 bits.

Timing is controled by a clock oscillator 223 and synchronism of the various registers and other devices is under control of the 23 stage ring counter 224. An OR gate 227 connected to the first 20 stages of the ring counter provides 20 shift pulses which are applied to the shift input of register 254 and also thru OR gates 241 and 242 to shift registers 201 and 202. Either shift register 1 or 2 is caused to divide by 2 the number held in its register in binary form. The division is the result of the application of an extra or 21st pulse thru an AND gate 243 or 244. The decision as to whether shift register 201 or 202 is to be caused to divide is determined by the up-down comparator or decision making element 247.

Comparator 247 examines the most significient binary digit in register 248 (SRX). If the most significant digit is a 1, the data in register 202 (SRB) is recirculated through gate 262 and the data from adder 207 is recirculated through register 201 (SRA) by enabling gates 265 and 259. An extra pulse, time period 21, is used to shift register 201 (SRA) an extra time, thus causing a division by two. Conversely, when the most significant digit in register 248 (SRX) is zero the data in SRA is recirculated and SRB obtains the data from adder 207 and is caused to divide by two.

When the 21st shift of register 201 (SRA) or 202 (SRB) takes place, it is essential to prevent a significant bit entering the most significant place of SRA. To this end an AND gate 265 in the adder 207 recirculation loop is disabled via an inverter 268 during the 21st shift pulse.

Since SRK has to effect ÷4 it receives both the 21st and 22nd shift pulses through OR gates 230 and 250 in addition to the 20 pulses from gate 227. During the 21st and 22nd pulses an AND gate 271 in the TK recirculation loop is disabled via an inverter 276. SRC has to effect ÷8 and therefore receives the 21st, 22nd, and 23rd shift pulses through OR gates 233 and 249, as well as the 20 pulses from gate 227. During the 21st, 22nd, and 23rd pulses an AND gate 272 in the C recirculation loop is disabled via an inverter.

Note that the contents of register 201 (SRA) is divided by two by the simple insertion of an extra pulse into the register while registers 9(SRK) and 10(SRC) effect a division by 4 and 8 by the insertion of 2 and 3 extra pulses respectively. Thus it is one of the powers of this invention that the algorithms are written in a form that only require division by factors of $2^n$ wherein this division can be accomplished by the insertion of $n$ additional pulses into the designated register.

The 23rd pulse of each group shift SRX 1 bit in the reverse direction to bring the next less significant bit of $x$ into the controlling position. When such a shift indicates that all $x$ digits left in SRX are O the circuit 251 yields the TERMINATE signal. This resets the flip-flop 219 to close the gate 220 and terminate the operations, leaving the required value in SRF.

Since SRX has 16 bits a full sequence of iterations takes 16 $x$ 23368 clock pulses. Allowing another 100 clock periods for loading $x$, $a$, $b$, K and C we have a total computation time of 45.8 $\mu$S utilising a 10 MHz clock.

Figure 22:
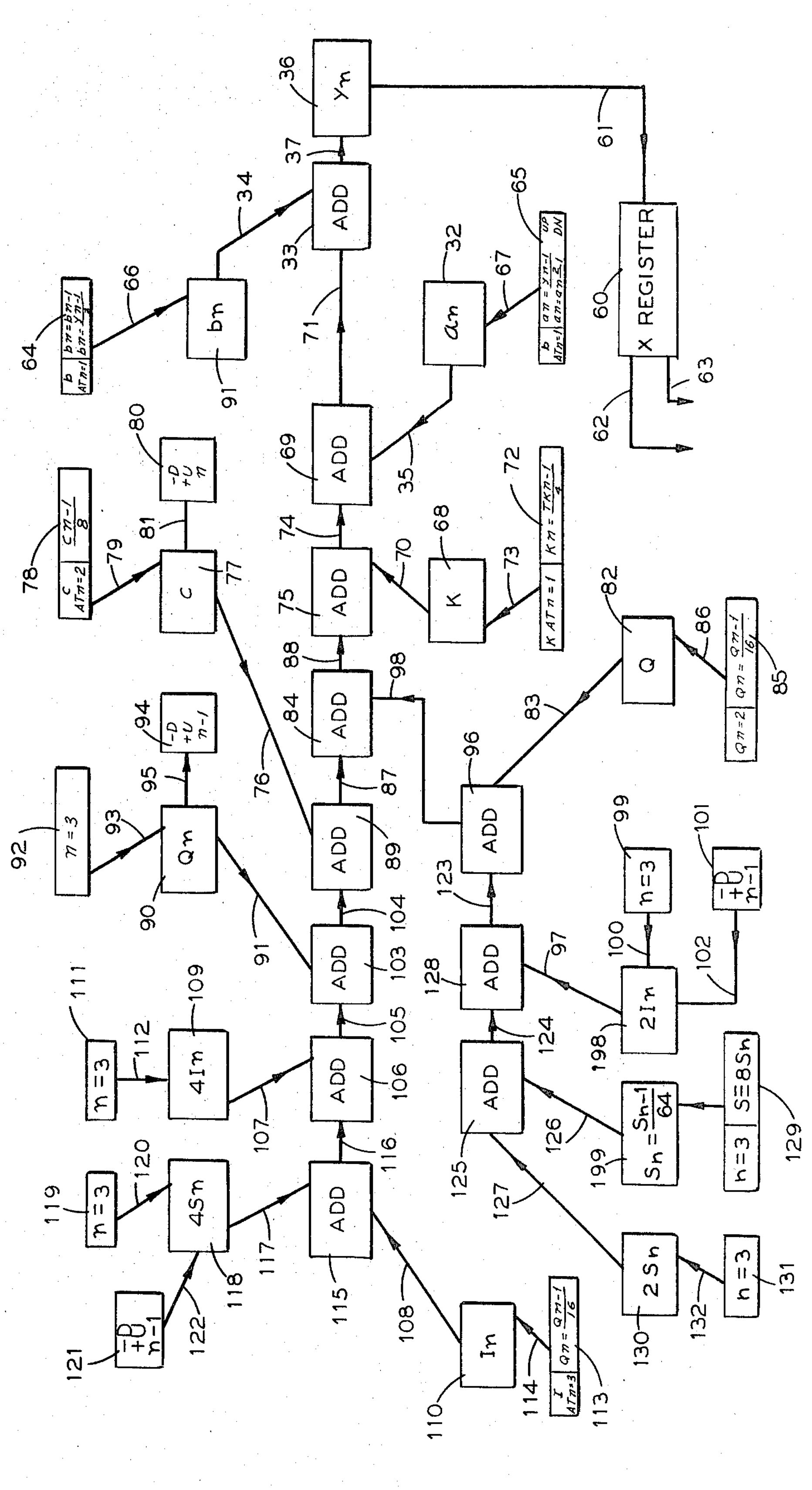

In FIG. 22 there is shown the flow chart for the sextic algorithm which will implement the binary polynomial expression:

$$y = (b + a)B_0^* + (b - a)B_1{}^* + KB_2^* + CB_3{}^* + QB_4{}^* + IB_5{}^* + SB_6^*$$

The apparatus shown and described with reference to FIG. 21 is employed in its entirity in the flow chart of FIG. 22. Several modifications to the interconnection circuitry of FIG. 21 must be made, however. Shift register 198 that was previously connected through path 97 to adder 96 is now connected to a new adder. Shift register 110 that was previously connected to adder 106 through path 108 is now connected to a new adder.

As shown in FIG. 22 adder 115 is connected through path 116 to adder 106. Path 116 contains the sum of the information contained on paths 108 and 117. Shift register 118 contains the transfer term $4S_n$ which is transferred through path 117 to adder 115. The initializing condition, $n = 3$, for shift register 118 is contained in box 119 and transferred through path 120 to shift register 118. The polarity conditions for the data contained in shift register 118 is contained in box 121 and is transferred through path 122.

The data transferred through path 123 to adder 96 is the sum of the information contained on paths 97 and 124. Adder 125 sums the information on paths 126 and 127. The sum of the information of these two paths is transferred to adder 128 through path 124. The sextic coefficient is held in register 199 and transferred through path 126 to adder 125. The staging and initializing conditions for shift register 128 are held in box 129. Transfer term $2S_n$ is held in shift register 130 and transferred through path 127 to adder 125. The initializing condition for this shift register is contained in box 131 and is transferred to path 132.

Figure 23:
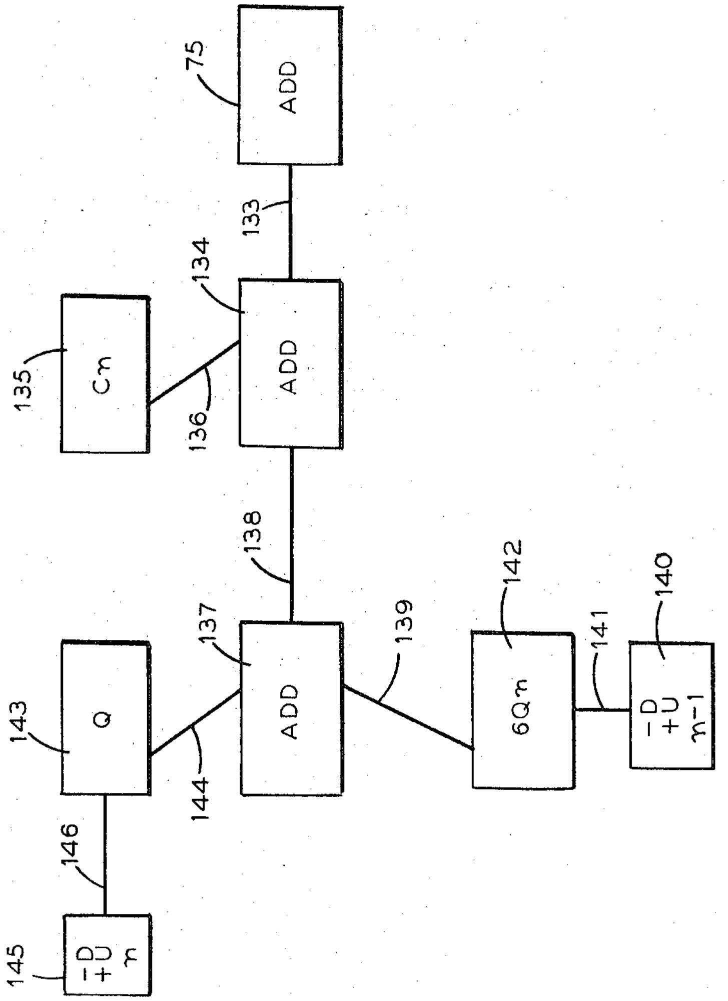
FIG. 23 is an alternate embodiment of the apparatus to implement the binary polynomial including quartic and higher order terms.

With reference to FIG. 23 an alternate algorithm arrangement may be derived for the quartic and higher orders. In FIG. 21 we have shown adder 75 which is similar in every respect to adder 75 of FIG. 19. Adder 75 is connected through path 133 to adder 135. The cubic coefficient $C_n$ is inserted from register 135 through line 136 to an adder 134. Adder 137 is connected to adder 134 through path 138. The value of the transfer term $6Q_n$ is inserted into shift register 142 and transferred to adder 137 through path 139. The polarity data is contained in box 140 and transferred through line 141 to the shift register 142. Coefficient $Q_n$ is held in shift register 143 and transferred to adder 137 through line 144. The polarity information is contained in box 145 and transferred through line 146 to shift register 143. This algorithm just described may be used to replace similar functions in the other flow charts of equivalent order. This algorithm is known as "sequential configuration" which may be derived from the odd-even split path algorithms at quartic and higher order levels.

Binary Polynomial Expressions have been described through the Octic order and algorithms together with the flow charts have been included through the Sextic order. Algorithms for the Septic and Octic orders are provided herein but require some minor modifications to the arithmetic steps previously described in relation to the quartic and higher order expressions.

In the previous discussion of points of exact fit, see table 3, points ⅛, ⅜, ⅝ and ⅞ were obtained by combining the 5th through the 8th order, to simplify the coefficient determination, the quintic and sextic terms are used to obtain an exact fit at ⅜ and ⅝ and the septic and octic terms for exact fit at ⅛ and ⅞. Table 3 now becomes as shown below.

TABLE 9

| Points of Exact Fit at | Additional Polynomial Terms Needed |
|---|---|
| $x = 0$ an 1 | $g_0B_0^*$ and $g_1B_1^*$ |
| $x = 1/2$ | $g_2B_2^*$ |
| $x = 1/4$ and $3/4$ | $g_3B_3^*$ and $g_4B_4^*$ |
| $x = 3/8$ and $5/8$ | $g_5B_5^*$ and $g_6B_6^*$ |
| $x = 1/8$ and $7/8$ | $g_7B_7^*$ and $g_8B_8^*$ |
| $x = 7/16$ and $9/16$ | $g_9B_9^*$ and $g_{10}B_{10}^*$ |

and so on. The complete binary polynomial expressions, equivalent to those discussed with reference to Tables 1 and 2, for the septic and octic orders now become,

TABLE 10

Septic $B_7^* = 2^{17}/15x\,(1-x)\,(x-1/2)\,(x-1/4)\,(x-3/4)\,(x-3/8)\,(x-5/8)\,g_7 = P$ Octic $B_8^* = 2^{19}/45x\,(1-x)\,(x-1/2)^2(x-1/4)\,(x-3/4)\,(x-3/8)\,(x-5/8)\,g_8 = E_1$

TABLE 11

Septic $B_7 = 2/15\,x\,(1+x)\,(1-x)\,(x+1/2)\,(x-1/2)\,(x+1/4)\,(x-1/4)\,g_7 = P$ Octic $B_8 = 2''/45\,x^2(1+x)\,(1-x)\,(x=1/2)\,(x-1/2)\,(x+1/4)\,(x-1/4)\,g_8 = E$ For the lower order expressions refer to tables 1 and 2.

Table 12 is a corresponding revision of the polynomial contribution i.e., the contribution of the polynomial order to the $y$ value for the first 3 binary stages of $x$ is shown. For the contributions as previously described see FIG. 7.

The septic and octic algorithms are,

SEPTIC ALGORITHM $$y = (b+a)B_0^* + (b-a)B_1^* + KB_2^* + CB_3^* + QB_4^* + IB_5^* + SB_6^* + PB_7^*$$

OCTIC ALGORITHM $$y = (b+a)B_0^* + (b-a)B_1^* + KB_2^* + CB_3^* + QB_4^* + IB_5^* + SB_6^* + PB_7^* + EB_8^*$$

TABLE 12.—Table of Contributions From Each Polynomial Order

| | $-1$ | $-\frac{3}{4}$ | $-\frac{1}{2}$ | $-\frac{1}{4}$ | $0$ | $+\frac{1}{4}$ | $+\frac{1}{2}$ | $+\frac{3}{4}$ | $+1$ | $B_n$ |
|---|---|---|---|---|---|---|---|---|---|---|
| | | | | | Value of $x$ | | | | | |
| Polynomial order | $0$ | $\frac{1}{8}$ | $\frac{1}{4}$ | $\frac{3}{8}$ | $\frac{1}{2}$ | $\frac{5}{8}$ | $\frac{3}{4}$ | $\frac{7}{8}$ | $1$ | $B_n^*$ |
| Linear | $2a$ | $\frac{7a+b}{4}$ | $\frac{3a+b}{2}$ | $\frac{5a+3b}{4}$ | $a+b$ | $\frac{3a+5b}{4}$ | $\frac{a+3b}{2}$ | $\frac{a+7b}{4}$ | $2b$ | |
| Quadratic | | $\frac{7}{16}K$ | $\frac{3}{4}K$ | $\frac{15}{16}K$ | $K$ | $\frac{15}{16}K$ | $\frac{3}{4}K$ | $\frac{7}{16}K$ | | |
| Cubic | | $-\frac{7}{8}C$ | $-C$ | $-\frac{5}{8}C$ | | $+\frac{5}{8}C$ | $+C$ | $+\frac{7}{8}C$ | | |
| Quartic | | $\frac{21}{16}Q$ | $Q$ | $\frac{5}{16}Q$ | | $\frac{5}{16}Q$ | $Q$ | $\frac{21}{16}Q$ | | |
| Quintic | | $-\frac{7}{8}I$ | | $+\frac{3}{8}I$ | | $-\frac{3}{8}I$ | | $+\frac{7}{8}I$ | | |
| Sextic | | $+\frac{7}{8}S$ | | $-\frac{1}{8}S$ | | $-\frac{1}{8}S$ | | $+\frac{7}{8}S$ | | |
| Septic | | $\frac{P}{2}$ | | | | | | $+\frac{P}{2}$ | | |
| Octic | | $+\frac{3}{4}E$ | | | | | | $+\frac{3}{4}E$ | | |
| Total | $y_0$ | $y_1$ | $y_2$ | $y_3$ | $y_4$ | $y_5$ | $y_6$ | $y_7$ | $y_8$ | |

The septic and octic algorithms are implemented with apparatus as shown in the flow chart of table 13. Because of the complexity of the chart the system of notation described in conjunction with the cubic algorithm, has been used.

TABLE 13.—Octic Algorithm $$y=(b+a)B_0^*+(b-a)B_1^*+KB_2^*+CB_3^*+QB_4^*+IB_5^*+SB_6^*+PB_7^*+EB_8^*$$

Initial condition and entry stage

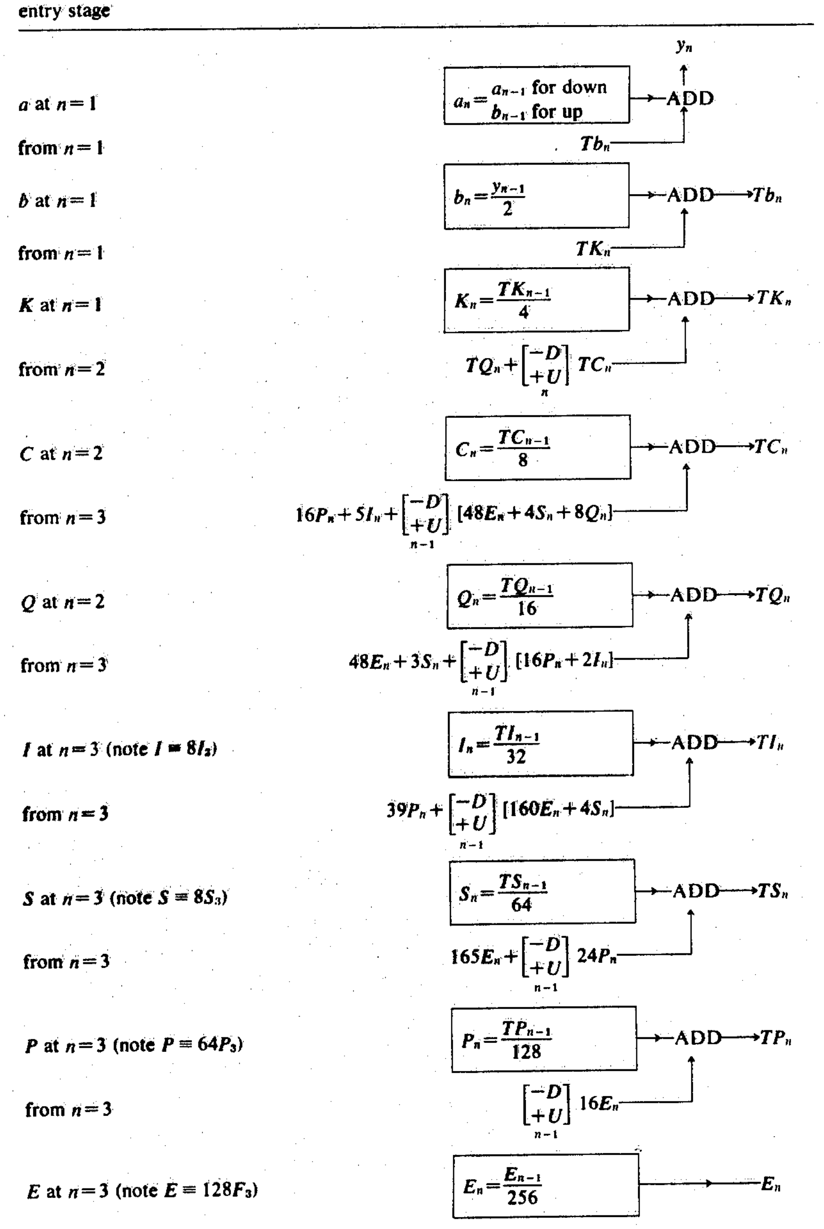

Note—Septic algorithm is given by eliminating the $E_n$ terms.

It is appropriate at this time to make some observations regarding the natural coefficient. The determination of the natural coefficient is a simple process up to and including the quartic order. All of the definitions up to that order are suitable for add-shift implementation. The definitions for the quintic to octic natural coefficients involve division by 7 and 3. This presents no problem for "desk calculator" computation, but is undesirable for real time determination in association with a fast data system. A simpler solution is available where the series terminates with the quintic or sextic order.

The following coefficient forms give a slightly better accuracy than the natural coefficients:

$$I' = -z_1 - z_3 + z_5 + z_7$$

$$S' = \tfrac{1}{2}(z_1 - z_3 - z_5 + z_7)$$

Coefficient forms suitable for add-shift implementation may readily be derived up to the octic order by using two term series approximations. It is difficult to extend this subject generally as it needs to be examined in the context of specific hardware. Further, prospects for telescoping higher order information are best considered at the same time, which point will be discussed hereinafter.

In hardware implementation, a firm decision must be made regarding the highest order polynomial available. Truncation of the polynomial series is therefore inevitable and a further decision is necessary in each application as to whether the natural coefficients will be retained or modified.

As previously defined, binary polynomial approximation is that which gives points of exact fit arising in a binary sequence of $x$. Limited coefficient modification, while improving accuracy, may in many cases retain the established points of exact fit.

However, in cases of significant coefficient modification, the binary polynomial hardware is essentially being used as a convenient vehicle for a different polynomial approximation approach. Before proceeding to coefficient modification, it is therefore advisable to insure that the reasons for operating in, or making use of, the binary polynomials are appreciated.

The significant reasons in order or importance are:

a. The binary polynomials are interpolated by efficient add-shift algorithms. The add-shift feature may be utilized to maximize economy or speed.

b. Given the coefficients of a specific function, the interpolation algorithm will then operate to solve for either the function or its inverse.

c. Coefficient determination is a relatively simple process.

d. The binary polynomials give points of exact fit at the extremes of the x span. This may be of particular value when a function is approximated by a number of zones, as there is no "position" discontinuity at the zone boundaries.

Following truncation, there is the possibility for improved accuracy while retaining all the above advantages.

In applications where (*c*) and (*d*) above do not apply, the full accuracy benefit of the Chebyshev polynomials may be obtained.

Binary polynomial hardware will provide mathematical functions from coefficients stored in a read only memory. In such cases, coefficient determination is a "one time" occurrence for read only memory specification. The ultimate approximation accuracy at a given polynomial order is that of the Chebyshev polynomials, and this may be obtained for each function as follows:

a. Truncate the Chebyshev approximation at the equivalent polynomial order;

b. Multiply the approximation out to a power series; and c. Refactorize into the equivalent binary polynomial series and then store the coefficients thus obtained in the read only memory.

The above approach is optimum when sufficient polynomial orders are available to insure that the approximation error does not exceed the quantum level of the digital answer delivered. When the error exceeds the quantum level, it may be considered more desirable to retain the exact fit points at the extremes of the $x$ range. In such cases, the binary polynomials should be used with the information from two additional polynomial orders telescoped into the higher order natural coefficients. The accuracy loss of this approach relative to Chebyshev is small.

We can now consider inverse functions with the method of the invention. The advantage present in the ability of the binary polynomial algorithms to deliver inverse interpolation solutions (using the forward function coefficients) is considerable in itself. However, a further advantage may be made of this feature for certain functions. A good example is $\log_2(x)$ where Chebyshev approximation to the 6th order gives:

$\log_2(x)$: error of 19 leading binary zeroes $\text{antilog}_2(x)$: error of 28 leading binary zeroes In this case the $\text{antilog}_2 x$ is stored in ROM and inverse interpolated for $\log_2 x$. The theoretical algorithm accuracy is then 28 bits in both cases, but quantization/slope definition problems will probably reduce this figure by one or two bits.

It is now possible to discuss the limited telescoping of coefficients. The above technique for coefficient determination by way of truncating Chebyshev approximations gives the ultimate benefit in telescoping possibilities. The practice of telescoping coefficients may, however, be employed in varying degrees for the limited forms retain a situation of simple coefficient determination. An example will be given for a case where 6th order binary polynomial hardware is available. The notation will use the form:

I for the natural binary polynomial coefficients

I′ for the modified coefficients.

Where lower order coefficients are not mentioned, the natural coefficients are to be assumed.

(*i*) Simplified Quintic and Sextic Coefficients

A form mentioned heretofore as a simple derivation for use with a truncation following the 5th or 6th order was:

$$I' = -z_1 - z_3 + z_5 + z_7$$

$$S' = \tfrac{1}{2}(z_1 - z_3 - z_5 + z_7).$$

This form makes use of information relevent to the 7th and 8th order coefficients and is therefore utilizing limited telescoping action.

The following comparative accuracy table shows the resulting accuracy for each of the 6th order polynomial approximation forms to be discussed. The table is specific to the function cos $\theta$ in the range 0° to 90°. The table illustrates both the advantage obtained over the natural coefficient and the residual deficiency relative to Chebyshev.

TABLE 8

| 6th Order Approximation used | Error Factor | Worst Case Error decimal | binary lead zeroes |
|---|---|---|---|
| Chebyshev $T_n^*$ Polynomials | 1.0 | 0.000 000 408 | 21 |
| Binary Polynomials 1 → 2 term telescoped | 1.22 | 0.000 000 499 | 20 |
| Binary Polynomials 1 → 1 term telescoped | 1.42 | 0.000 000 578 | 20 |
| Binary Polynomials with simplified I′ and S′ coefficients | 2.43 | 0.000 000 991 | 19 |
| Binary Polynomials with natural | 3.69 | 0.000 001 504 | 19 |
| Taylor Series 6th order expansion about $x$ = ½ where x, 0 → 1 $\theta$, 0 → 90° | 69.3 | 0.000 028 3 | 15 |

(ii) "One-to-One" Term Telescoping

For a 6th order hardware example, this form requires determination of the septic and octic coefficients which are then used to modify the quantic and sextic natural coefficients, respectively. A reasonable optimization is given by:

$$I' = I + 5/8P$$

$$S' = S + E$$

The error factor and worst case errors can be seen on line 3 of Table 8. The above may now be substituted into the "residual need" derivation form for direct derivation:

$$I' = 4/7(z_7 - z_1)$$

$$S' = 11/14(z_7 + z_1) + 3/2(z_3 + z_5)$$

(iii) "One to Two" Term Telescoping

This is similar to (iii) above, but with coefficient modification extended to the quartic and cubic coefficient as follows:

$$C' = C + P/8$$

$$Q' = Q - E/16$$

$$I' = I + 11/16P$$

$$S' = S + E$$

It will be observed that the foregoing techniques can be extended by "polynomial extrapolation." By extrapolation, in this context, is meant the extension of the polynomial beyond the $x$ range for which the coefficients were originally determined. Normally, it will be necessary to find new coefficients. The accuracy of extrapolation is, of course, dependent upon the specific function being handled. If the function is a polynomial of x not exceeding the binary polynomial order available there will be no deficiency in the extrapolation. The techniques for such extrapolation will not be dealth within detail here, but it is suggested that particular applications can be analogized to familiar transcendental functions of comparable convergence.

Reiterated briefly, the instant invention utilizes an arrangement of registers as a fundamental tool for approximating the solution of a function through the process of iterative interpolation, that is, repeated bisection of the segment of interpolation. The arrangement includes at least first, second and third registers for storing the parameters defining a segment of interpolation and at least one correcting term and control means for entering in each register a linear algebraic combination of the contents of one or more of the registers divided by a power of two, namely, the zero, first and second powers of two for three of the registers respectively. To achieve suitable accuracy there are typically more than three registers. Thus, in addition to the first and second registers, there can be an ordered plurality of registers, including the third register, each of which receives a linear algebraic combination of its own contents and, except for the highest order register, the contents of the register(s) higher in order, which combination is divided by $2^2 = 4$ in the case of the third register, by $2^3 = 8$ in the case of the fourth register an so on, if there are more registers.

The iterated formation of the linear algebraic combinations is defined by the add-shift algorithm, the specific form of which, however, can vary. In general the add-shift algorithm has the advantage of being particularly easy to implement since the only operations necessary are additions (with the understanding that sign has to be taken into account and some "additions" are in fact substractions) and shifts of significance which effect division by 2, 4, etc.

To a large extent the form of the algorithm is determined by the quantities selected as initial entries to the registers. These need not be the quantities set out herein. For example, with suitable modifications of the algorithm it would be possible to effect a series of interpolations using initial entries consisting of sample values of the dependent variable. Additionally, instead of supplying two initial point values from the ROM to the registers, one point value and the binary value of the slope of the straight line 4 (FIG. 2) might be the two initial values supplied to the ROM for approximating the solution of the given function. Regardless of the algorithm utilized, however, the same pattern of registers would still be employed, namely $a \div 1$ register, $a \div 2$ register, $a \div 4$ register, and so on.

The power of the invention may be appreciated by way of example. Sin $x$ can be interpolated over the range 0° to 90° to an accuracy of 12 bits using as stored information (in addition to the two starting values of sin 0° and sin 90°) nothing more than three coefficients for quadratic, cubic and quartic terms respectively. What is more, exactly the same hardware or software will interpolate a whole host of other functions, for each of which it is merely necessary to store the appropriate two initial values plus three coefficients.

While certain advantageous embodiments have been described herein it will be recognized that various changes and modifications can be made without departing from the scope of the invention as defined in the appended claims.

What is claimed is

1. In a digital system a method of approximating a desired value of a function included within a segment between two selected function point values, the method comprising the steps of interpolating between first and second digital signals representative of the two point values to generate a digital signal representative of a midpoint point value, compensating the result of the interpolation to generate a digital signal representative of a new function point value, replacing one of the first and second digital signals representative of two function point values by said new digital function point value signal thus generated to define a next segment which includes the desired value of the function, and repeating the steps of interpolating, compensating and replacing in successively smaller next segments containing the desired value of the function until the new point approaches the desired value to within a preselected degree of accuracy.

2. A method according to claim 1 wherein the step of compensating comprises algebraically combining a digital signal representative of a correcting term with the digital midpoint signal generated by the linear interpolation.

3. In a digital system a method of automatically calculating an approximate value of a function of an independent variable by midpoint interpolation between two stored point values defining a segment comprising the steps of adding digital signals representative of the two stored point values to obtain a digital signal representative of the sum of the two stored point values, dividing by two the sum of first and second digital signals representative of the two stored point values to generate a digital midpoint signal, storing a digital signal representative of a predetermined value of a first correcting term, compensating at least a first one of the new digital midpoint signals thus generated by the addition of at least one first correcting term to form a compensated digital midpoint signal, replacing one of said first and second digital signals representative of the two stored point values by said compensated digital midpoint signal generated by compensating the midpoint interpolation to create a new segment containing a given value of the independent variable, repeating the steps of adding, dividing, compensating and replacing to generate new digital signals defining successively smaller segments having end points converging upon the given value.

4. A method according to claim 3, wherein the steps of compensating further comprises the step of dividing the stored digital signal representative of a predetermined value of a first correcting term successively by four to form a second correcting term for the successive steps of repeating.

5. A method according to claim 4, wherein the step of compensating further comprises the steps of dividing the second correcting term successively by eight to form a third correcting item for successive steps of repeating.

6. A method according to claim 3, wherein the step of compensating further comprises the step of dividing by a power of two the value of the previous correcting term to generate a digital signal representative of a new correcting term for compensating at least some newly generated digital midpoint signals before each successive step of repeating and wherein the power of two is related to the step of repeating.

7. A method according to claim 6, wherein the step of compensating further includes the step of modifying the digital signal representative of the new correcting term by combining therewith a signal representative of a cross term which is a multiple of another correcting term.

8. A method according to claim 6, wherein the sign of at least one of the digital signals representative of the terms is dependent upon whether the new segment created after the step of replacing is Up or DOWN with respect to the new value generated in the current interpolation.

9. A method according to claim 6, wherein the sign of at least one of the digital signals representative of the terms is made dependent upon whether the new segment created after the step of replacing was UP or DOWN with respect to the new value generated in the previous interpolation.

10. A method according to claim 3, wherein the step of compensating further comprises calculating a plurality of digital signals representative of the initial values of the correcting terms, the correcting terms being calculated by the method steps of adding, dividing, storing, compensating, replacing and repeating the same as automatically calculating approximate values of functions of another independent variable.

11. A method according to claim 3, wherein the step of compensating further includes generating digital signals representative of initial values of the correcting terms, the values being calculated at intervals during the steps of interpolation in real time operation from given point values of the function and, between such intervals, values of the function intermediate the point values are calculated by the steps of interpolation.

12. Apparatus for interpolating a function of an independent variable to determine the value of the function of a given value of the independent variable, comprising means for storing digital signals representative of two point values of the function at the ends of a segment containing the said given value, means responsive to said means for storing for adding two point values to generate a digital signal representative of the sum value, dividing means responsive to said means for adding for generating a digital signal representative of a half sum value, means responsive to said dividing means for modifying said half sum value by a signal representative of at least one correcting term, control means responsive to said means for modifying for replacing one of the stored point values by the modified half sum value to establish digital signals representative of two point values at the end of a shorter segment containing the said given value, and timing means for timing the operation of said apparatus iteratively so that successively smaller segments of interpolation converge upon the said given value.

13. Apparatus according to claim 12, wherein said means for modifying combines said signals representative of the at least one correcting term algebraically with said signals representative of the half sum value.

14. Apparatus according to claim 12 wherein said means for modifying includes a store for storing signals representative of a plurality of correcting terms, and means for extracting the correcting term signals from said store during a plurality of interpolations.

15. Apparatus according to claim 12 wherein said means for modifying includes at least one store for storing said signals representative of a correcting term to be used in a succession of interpolations, and means for dividing said correcting term signals by a higher power of 2 following each interpolation.

16. Apparatus according to claim 15, wherein said means for modifying is adapted to store signals representative of a sequence of correcting terms starting from a quadratic term and further comprises first means for dividing the signals representative of said correcting terms by 4 and the successively higher powers of 2, respectively, following each interpolation.

17. Apparatus according to claim 16, wherein said means for modifying further includes means for adding at least one signal representative of a higher order term to a signal representative of at least one of said correcting terms and second means for dividing said higher order term by its corresponding power of two.

18. Apparatus according to claim 17, wherein said means for modifying further includes means for adding a signal representative of at least one correcting term with a signal representative of a multiple of at least one higher order term to form a modifying multiple signal.

19. Apparatus according to claim 18, wherein said means for modifying further includes means responsive to said control means for selecting the sign of said modifying multiple signal and wherein said sign is determined by which of the two stored point value signals was replaced by the half sum value signal in the preceding interpolation.

20. Apparatus according to claim 12, wherein said control means includes a binary register for holding a signal representative of a given value of the independent variable and means for examining the bits in this register in ordered sequence at the rate of one per interpolation to determine in accordance with the value of the bit which of the two stored point value signals is to be replaced by the half sum value signal.

21. Apparatus according to claim 12 wherein said means for storing digital signals representative of the point values includes a plurality of shift registers; and means for modifying includes at least one shift register for storing at least one correcting term signal and said means for adding includes a plurality of full adders for adding the contents of registers in bit serial, word parallel operation, with a plurality of recirculating correction signals for re-entering said sum value signals and signals representative of the correcting terms in the registers.

22. Apparatus according to claim 21, wherein said control means further includes logic means to overshift the quantities re-entering the shift registers to effect division of the sum value signal by 2 and division of the signals representative of the correcting terms by their corresponding powers of 2.

* * * * *

UNITED STATES PATENT OFFICE

CERTIFICATE OF CORRECTION

Patent No. 3,789,203 Dated January 29, 1974

Inventor(s) Reginald Catherall and Susan Knowles

It is certified that error appears in the above-identified patent and that said Letters Patent are hereby corrected as shown below:

IN THE HEADING:

In the title, change "INTERATIVE" to -- ITERATIVE --.

IN THE CLAIMS:

Column 31, line 34, delete "item" and insert therefor -- term --.

Column 32, line 13, delete "of" and insert therefor -- at --.

Column 33, line 15, delete "and" and insert therefor -- said --.

Signed and sealed this 20th day of May 1975.

(SEAL)
Attest:

RUTH C. MASON
Attesting Officer

C. MARSHALL DANN
Commissioner of Patents and Trademarks